(12) United States Patent
Mammen

(10) Patent No.: US 7,907,966 B1
(45) Date of Patent: Mar. 15, 2011

(54) SYSTEM AND METHOD FOR CROSS-PLATFORM APPLICATIONS ON A WIRELESS PHONE

(75) Inventor: Abraham Mammen, Pleasanton, CA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 11/184,277

(22) Filed: Jul. 19, 2005

(51) Int. Cl.
  *H04M 1/00* (2006.01)
  *G06F 3/048* (2006.01)

(52) U.S. Cl. .................. 455/557; 715/765; 715/790

(58) Field of Classification Search .................. 455/557; 715/765, 790
See application file for complete search history.

(56) References Cited

U.S. PATENT DOCUMENTS

| | | |
|---|---|---|
| 5,029,183 A | 7/1991 | Tymes |
| 5,084,877 A | 1/1992 | Netravali et al. |
| 5,222,061 A | 6/1993 | Doshi et al. |
| 5,327,554 A | 7/1994 | Palazzi, III et al. |
| 5,444,718 A | 8/1995 | Ejzak et al. |
| 5,457,680 A | 10/1995 | Kamm et al. |
| 5,465,401 A | 11/1995 | Thompson |
| 5,546,382 A | 8/1996 | Fujino |
| 5,564,070 A | 10/1996 | Want |
| 5,598,534 A | 1/1997 | Haas |
| 5,664,091 A | 9/1997 | Keen |
| 5,673,322 A | 9/1997 | Pepe et al. |
| 5,742,668 A | 4/1998 | Pepe et al. |
| 5,742,905 A | 4/1998 | Pepe et al. |
| 5,790,536 A | 8/1998 | Mahany et al. |
| 5,809,415 A | 9/1998 | Rossmann |
| 5,831,664 A | 11/1998 | Wharton et al. |
| 5,842,210 A | 11/1998 | Chen et al. |
| 6,014,429 A | 1/2000 | LaPorta et al. |
| 6,061,718 A | 5/2000 | Nelson |
| 6,076,113 A | 6/2000 | Ramanathan et al. |
| 6,112,323 A | 8/2000 | Meizlik et al. |
| 6,289,362 B1 | 9/2001 | Van Der Meer |
| 6,298,038 B1 | 10/2001 | Martin et al. |
| 6,397,259 B1 | 5/2002 | Lincke et al. |
| 6,417,874 B2 | 7/2002 | Bodnar |
| 6,442,251 B1 | 8/2002 | Maes et al. |
| 6,457,879 B1 | 10/2002 | Thurlow et al. |
| 6,496,979 B1 | 12/2002 | Chen et al. |
| 6,509,913 B2 * | 1/2003 | Martin et al. .................. 715/762 |
| 6,567,416 B1 | 5/2003 | Chuah |
| 6,580,916 B1 | 6/2003 | Weisshaar |
| 6,584,564 B2 | 6/2003 | Olkin et al. |
| 6,590,588 B2 | 7/2003 | Lineke et al. |

(Continued)

OTHER PUBLICATIONS

Office Action in U.S. Appl. No. 11/184,278 (abandoned) mailed Nov. 6, 2006 (9 pages).

(Continued)

*Primary Examiner* — George Eng
*Assistant Examiner* — Muthuswamy G Manoharan
(74) *Attorney, Agent, or Firm* — Finnegan, Henderson, Farabow, Garrett & Dunner LLP

(57) ABSTRACT

A system and method for operation of cross-platform applications on a wireless phone is provided. The applications can be cross-platform applications in that the same application code can be run on different wireless phone platforms. The method and system can for a wireless phone which runs a cross-platform application that enables the processor of the wireless phone to run the cross-platform applications. The wireless phone processor can operate to determine platform parameters of the phone and then run the cross-platform application using the determined phone parameters.

17 Claims, 12 Drawing Sheets

U.S. PATENT DOCUMENTS

| | | |
|---|---|---|
| 6,600,930 B1 | 7/2003 | Sakurai et al. |
| 6,610,105 B1 | 8/2003 | Martin et al. |
| 6,654,428 B1 | 11/2003 | Bose et al. |
| 6,658,409 B1 | 12/2003 | Nomura et al. |
| 6,658,654 B1 | 12/2003 | Berry et al. |
| 6,681,110 B1 | 1/2004 | Crookman et al. |
| 6,802,058 B2 * | 10/2004 | Banavar et al. ............... 717/138 |
| 7,266,370 B2 * | 9/2007 | Paddon et al. ................ 455/418 |
| 2002/0099753 A1 | 7/2002 | Hardin et al. |
| 2002/0180798 A1 | 12/2002 | Poor et al. |
| 2003/0067489 A1 * | 4/2003 | Candy Wong et al. ....... 345/765 |
| 2003/0149743 A1 | 8/2003 | Baluja et al. .................. 709/217 |
| 2003/0149958 A1 | 8/2003 | Baluja et al. .................. 717/106 |
| 2004/0158577 A1 | 8/2004 | Chu et al. |
| 2005/0283734 A1 * | 12/2005 | Santoro et al. ................ 715/765 |
| 2006/0077941 A1 | 4/2006 | Alagappan et al. |
| 2006/0101162 A1 * | 5/2006 | Ivarsy et al. ...................... 710/8 |

OTHER PUBLICATIONS

Office Action in U.S. Appl. No. 11/184,278 (abandoned) mailed Feb. 27, 2007 (7 pages).

Office Action in U.S. Appl. No. 11/184,278 (abandoned) mailed Sep. 12, 2007 (6 pages).

\* cited by examiner

SYSTEM AND METHOD FOR CROSS-PLATFORM APPLICATIONS ON A WIRELESS PHONE

RELATED APPLICATIONS

This application is related to an application entitled SYSTEM AND METHOD FOR PROVIDING APPLICATIONS FOR WIRELESS COMPUTING DEVICES, application Ser. No. 11/184,278 (abandoned), which is filed the same day as the present application, and which is incorporated herein.

BACKGROUND

FIG. 1 illustrates an embodiment 100 of a prior art wireless communication system. In particular the wireless system 100 relates to widely used cellular phone system. The system 100 provides for a wide variety of different cellular phones 102 which can be used in a given system. As will be discussed, in more detail below, in any given cellular phone system a wide variety of different types, or platforms, of cellular phone devices can be used. For example, in many present cell phone systems a number of the cell phones used in the system will be of relatively old platforms which generally have low resolution displays. In some cases the displays will be generally monochromatic displays, and for newer phones, displays can provide for very high resolution color graphics. In addition, to the different displays which can be used, different phone platforms can utilize a range of different processors, files systems and memory sizes.

In the past cell phone systems have allowed for both voice only cell phones, and for voice and data cell phones. The discussion herein is directed primarily to services provided to voice and data cell phones, where a voice and data cell phone is one which can transmit voice information and data which can provide for different applications, and media for use on the wireless phone. The media can include a wide range of different data, such as images, audio, video, text, and games etc. In operation the cell phone will transmit and receive data through a cell tower 104. The transmission of data through the cell tower can then coupled through various networks, and/or communication links, to a service carrier server. In the past the carrier servers have generally maintained substantial repositories, shown as N×M application matrix 108, of different applications which can be transmitted to the different cell phones used in the cellular phone system 100. It should be recognized that the N×M application matrix could be stored on the carrier server 106, or on other storage devices coupled with the carrier server.

Presently cellular phone systems are provided by a number of different service carriers, and these different service carriers typically utilize a range of different technologies to provide similar services. For example, one widely utilized cellular phone system uses GSM (Global System for Mobile Communication) technology; service carriers using this type of technology include AT&T, Cingular, Vodaphone and Sprint. Another widely used system uses CDMA (code-division multiple access) technology: service provides using this type of technology include Verizon; US Cellular; and Bell South.

Typically each service carrier system will provide a wide range of different wireless phone options for its customers, and each of the phones can be utilized in the wireless communication system. Each of these different wireless phones has different properties and requires that each application running on the cellular phone take into account specific properties of the particular phone platform being used. In the past in order to accommodate each of the different phone platforms, the applications available for use on the phones, had to be specifically customized for each of the different phones which could be used in a particular system.

In one example, a carrier could allow for a total of 100 different models being used on the wireless communication system. Each of these different models will be referred to herein as a platform. The carrier server will then need to have 100 different versions of each application if it wishes for the application to be available for users of each of the 100 different platforms. Thus, each carrier will need to provide for a matrix of applications 108. The matrix will be an N×M matrix where N corresponds to the number of different wireless phone platforms and the M corresponds to the number of different application which are available on the wireless communication system 100. This past implementation has created a great deal of overhead associated with deploying different applications across a range of different platforms. For example, if a change were being made to an application, then consideration would need to be given as to how to best implement this change in each of the N different versions of the application. Further, in order to maintain a consistency across a range of different platforms, each time a new application is made available, the application would need to be customized for N number of different platforms.

FIG. 2 illustrates additional aspects of a prior art system 200. In the system 200 the wireless phone 202 is coupled to a carrier server through a carrier services infrastructure 204. The carrier services infrastructure 204 would include elements such as the base station or cell tower, as shown in FIG. 1, and any other elements necessary to provide for communications between the wireless phone and the carrier network, and the carrier server. In one embodiment the carrier server 206 operates to initially identify a phone which has initiated communications with the carrier server. The identification of phone 202 then allows the carrier server 206 to make determinations as to what format, and type of data information should be transmitted to the phone 202. The carrier server 206 and phone 202 can communicate using different types of information. At one level when the phone initially transmits information to the carrier server 206, and potentially at other subsequent points of operation, the phone will also transmit information to the carrier server identifying the phone, and/or the user of the phone. Based on the identified phone platform, the carrier server 206 will make determinations as to how to format page display information which will be transmitted to the phone 202. This type of display page information data which is transmitted to the phone, is shown as communication 212, and is sometimes referred to as presentation data, or a presentation layer communication.

For example, if the user of the phone requests a list of applications available for use on the phone, the carrier server can then transmit a page 209 to the phone with a list of available applications. FIG. 2, illustrates a list of applications 1 ... N shown on a display screen 208 of the phone 202. Based on the type of phone platform, the carrier server 206 will format application list page 209 such that it is of a size and style type which will fit on the display screen 208 of the particular phone platform.

Once the list of applications is displayed on the phone, the user can use the user input devices 210 (such as keypad buttons, or cursor control devices, for example) of the phone, to select a user desired application. This user application selection information 214 is then transmitted to the carrier server 206. Upon receiving the signal 214 from the phone indicating the user selected application, the carrier server 206 will then identify the appropriate version of the application, from the N×Mapplication matrix 216 and transmit the application as executable code 218 to the phone 202. Executable code could be binary code which is formatted for execution on a particular type of processor, or in some situations the executable code could be a type of byte code which is executable by a range of different processors, where the processor is operating a virtual machine environment of execution of byte code. Although not shown in FIG. 2, it should also be recognized that prior systems, also allow for a user of the phone to access the internet through the carrier infrastructure 204. Typically, the user of the phone can then access information at different internet addresses through the phone using a browser operating on the phone. In the past many wireless phones have used a WAP (wireless application protocol) browser. The WAP browser operates to provide a presentation of information obtained from servers coupled to the internet. The WAP browser is generally a stateless device which operates to present information which is provided to it. As a user moves from one page to another page of information, the WAP browser will simply present a rendering for each obtained page. In operation of wireless phones, the WAP browsers have exhibited some limitations. One limitation is that the pages which are presented on the display of the phone must either be formatted by some external server so that the information transmitted to the WAP browser is of an appropriate form for a given phone platform. Where a wide variety of phone platforms with different screen sizes are used, this can create a challenge in terms of keeping track of different formatting requirements for the range of different types of phone platforms. Another issue is that the transmission of information through the wireless communication system to the phone is generally of fairly limited bandwidth, thus the stateless nature of a browser, where each page in its entirety is transmitted to the phone when there is a change in the image presented on the display screen, can result in a relatively slow interaction for communication between the phone and whatever server is being accessed by the phone.

It should be noted that while much of the discussion above refers to a phone as being the device communicating through the wireless communication systems 100 and 200, the wireless phone as described herein is a handheld computing device, which transmits data through a carrier system, which is also referred to herein as a wireless data communication system. The phone allows for transmission of voice data between users of different phones, and further the phone can also provide for a wide range of other functions such as operating as personal digital assistance, camera, and essentially any computing device that provides a platform for wireless communications through a wireless communication system.

DETAILED DESCRIPTION

One aspect of an embodiment of the present invention is to provide for a system and method which utilizes cross-platform applications. These cross-platform applications are such that, in conjunction, with other elements of the system herein, the cross-platform applications can be utilized on a plurality of different phone platforms.

Figure 1:
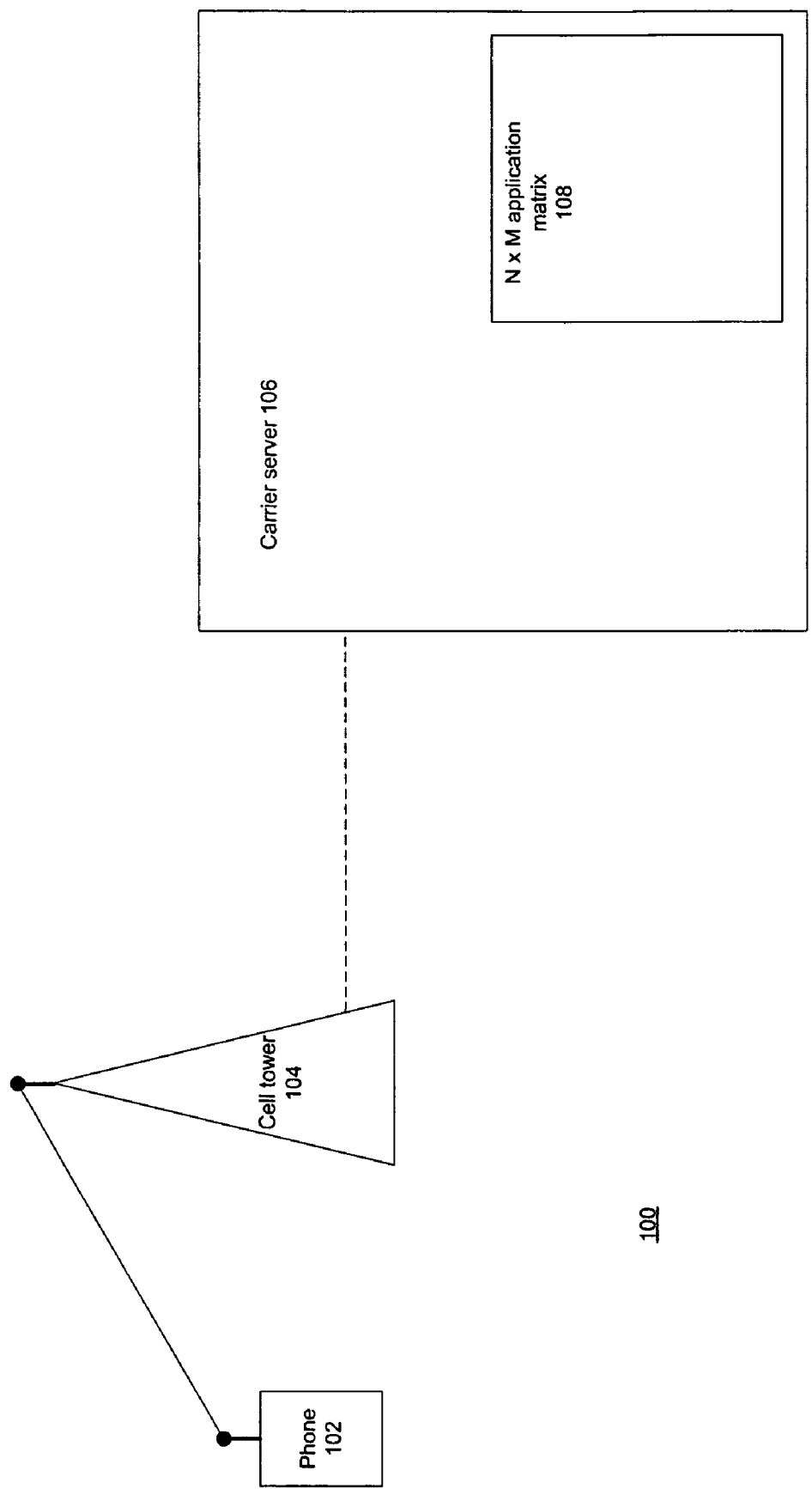
FIG. 1 shows a wireless communication system of the prior art, where a matrix of different versions of applications is provided for a range of different wireless phone platforms.
Figure 2:
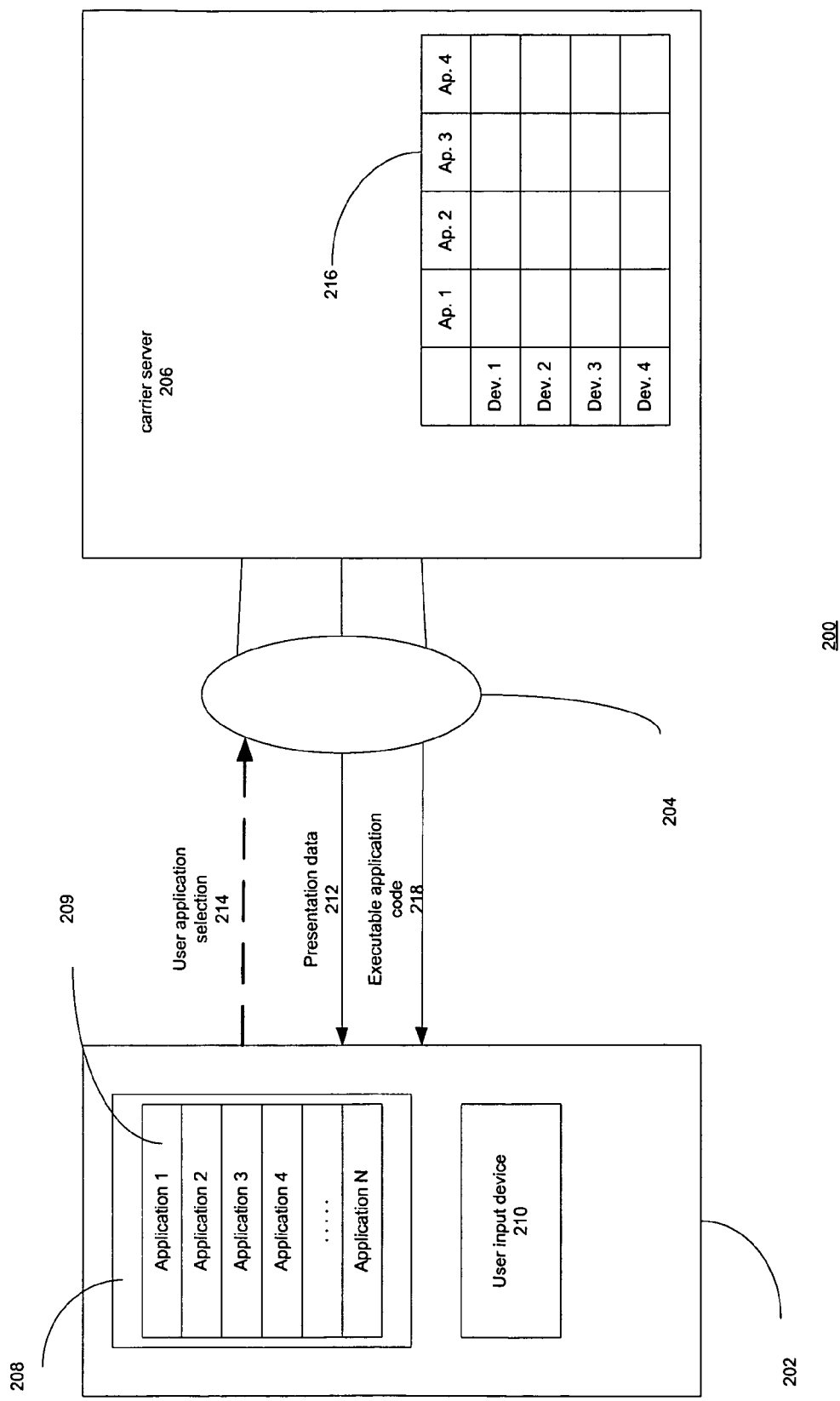
FIG. 2 provides additional details for elements of wireless communication system of the prior art.
Figure 3:
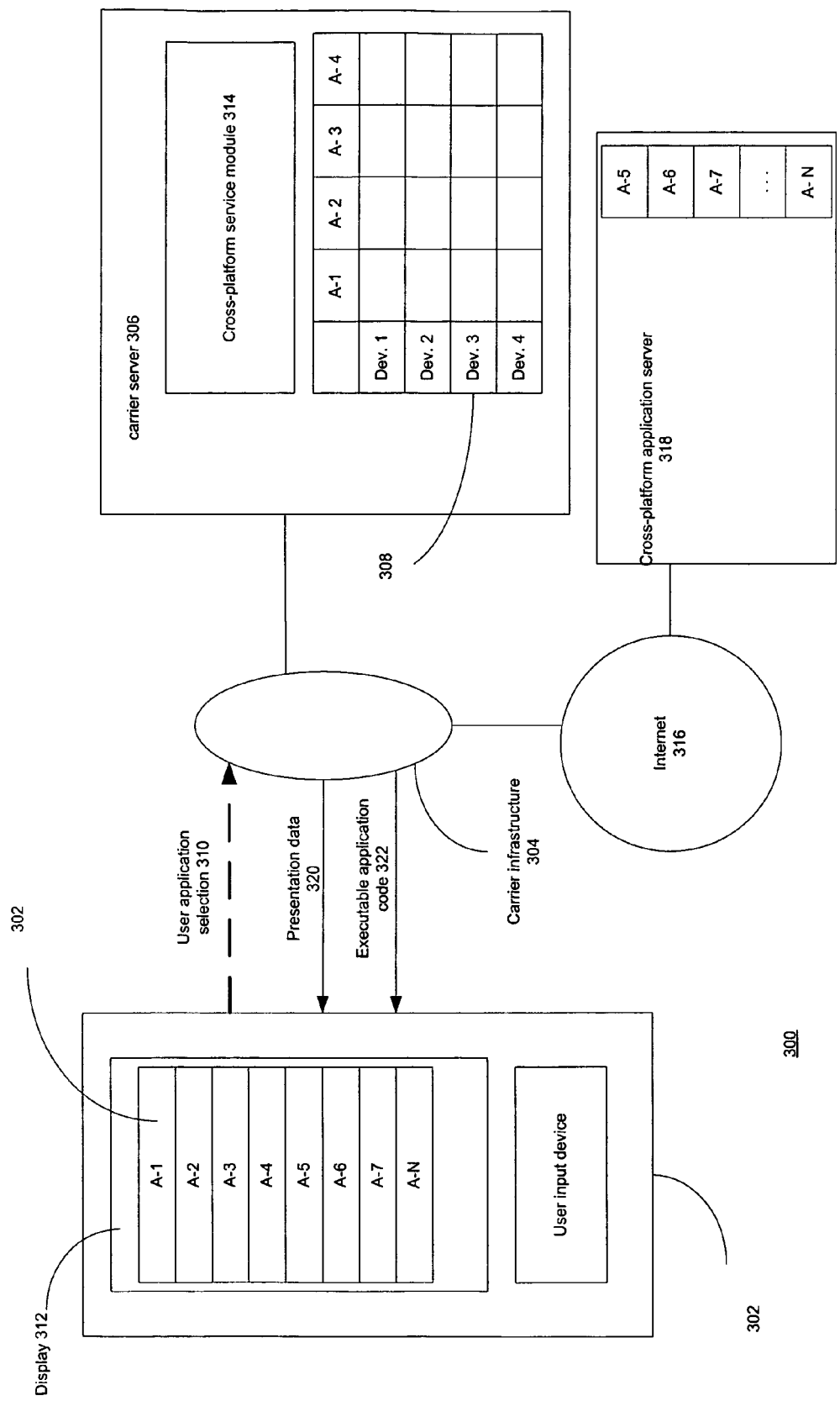
FIG. 3 shows an embodiment of a wireless communication system of the present invention.

FIG. 3 shows an embodiment of a system 300 of the present invention. The system includes a variety of different phones 302. The phones 302 can include a wide variation of different handheld wireless devices such as traditional wireless phones, which operate to transmit and receive data through a wireless carrier's infrastructure 304, and of course the phone can include a wide range of additional functions. When a user initiates operation of the phone 302, and potentially at subsequent points during the operation of the phone, the user can make a request to a carrier server 306 for list of available applications.

In response to a user request the service carrier server 306 can transmit a list of available applications to the phone 302. In one embodiment the carrier server 306 will include the functions described above in connection with previous systems, where the service carrier will provide access to a matrix 308 of different available applications where each application (A-1 thru A-4) is specifically tailored for one of the variety (Dev. 1 thru Dev. 4) of different phone platforms. Generally, the service carriers use a detailed screening process, whereby applications included in the matrix 308 are tested for performance and other issues before being incorporated into the matrix of different available applications. The collection of applications is sometimes referred to as an application deck, or a carrier deck. This wireless communication system is generally a closed or secure system, where the applications which can be loaded onto the phone are restricted to those applications made available through the carrier server.

An embodiment of the present invention provides for some expansion and flexibility over previous wireless communication systems. FIG. 3 shows a general illustration of the architecture for an embodiment of a system 300 herein. In operation when the user of the phone 302 initially accesses the carrier server 306, for example by selecting 310 an application from a list of applications page 311 is shown on the display screen 312. The carrier server 306 will identify the selected application. If the user selected application is an application which is implemented in the manner described above in connection with prior systems, then the carrier server will access the N×M matrix 308 of applications, and transmit the application corresponding to the type of wireless phone platform which the user is using.

In an embodiment of the present invention a different type of application will also be provided, which can be run across a number of different models of the wireless computing devices. In one embodiment for example, when a user has selected an application, shown as A-5 in the application list page 311 shown on the display screen 312 of the wireless phone 302, the operation will provide for transmitting application A-5 as a cross-platform application. In one embodiment, the service carrier server 306 will include a cross-platform server module 314, which will operate to determine if a cross-platform application shell has been installed on the phone. If the cross-platform server module 314 determines that a cross-platform application shell has not yet been installed on the wireless computing device 302, then the cross-platform server module will operate to transmit the cross-platform application shell to the wireless phone. The cross-platform service module will also provide the wireless computing device with an address for the selected application A-5. Where the selected application is a cross-platform application, the address for the cross-platform application, will in one embodiment, be a URL (uniform resource locator address) and the wireless device will request the application residing at the address provided by the carrier server 306.

When the cross-platform service module 314 determines that the cross-platform shell application has already been installed on the phone 302, then the cross-platform service module will operate to transmit the address of the requested cross-platform application to the phone.

The phone 302 is provided access to the interne 316 through the carrier infrastructure 304. In one embodiment the address of the user selected cross-platform application will correspond to a file located on a cross-platform application server 318. For example, the cross-platform application server 318 is shown as having a number of different cross platform applications A-5 thru A-N. In response to a request from a phone 302, the cross-platform application server 318 will transmit the file corresponding to the selected application to the wireless computing device.

In one embodiment the phone 302 will directly access the carrier server 306 through carrier server infrastructure 304. This communication between the phone 302 and the carrier server 306 can in many instances be implemented without the communications being transmitted through the internet. In contrast some embodiments will provide for communications between the phone 302 and cross-platform application server 318 to occur through the internet 316. Of course it should be recognized whether the communications are provided through the internet or through alternative communication network, it is significant to note that the cross-platform application server need not be contained within the domain of carrier server 306. Thus, an application service provider can provide a multitude of different applications to user of the phone, once the cross-platform application shell has been installed on the phone. In one embodiment the only involvement the carrier server 306 would have in the process is to provide address information for the various applications made available on the cross-platform application server 318, and providing the initial transmission of the cross-platform application shell. Indeed, in some embodiments the cross-platform application shell is pre-installed on the phone when it is initially sold or leased to the user customer, so the carrier server need not provide for the actual transmission of the cross-platform application shell. Additionally, in some embodiments, the cross-platform application server can be accessed by a phone using an address provided by the carrier server, and then the cross-platform server can operate to provide a listing of different cross-platform applications available on the cross-platform application server.

As will be discussed in more detail below, the combination of using a cross-platform application shell, with a cross-platform application, as implemented in an embodiment herein allows for a wide range of different wireless computing devices to receive an application transmitted through the carrier infrastructure 304 such that a single cross-platform application can be executed on a wide range of different wireless device platforms.

In the context of discussing the system 300 illustrated in FIG. 3, it is helpful to consider some additional aspects of its operation. Initially when a user starts data communication between the phone 302 and the carrier server 308, the carrier server will identify the particular phone platform and the user of the phone. Generally, the data transmitted from the phone 302 to the carrier server 306b will include some identification information which allows the carrier to identify the phone and the corresponding customer user of the phone. Indeed, the carriers will often want to track the use of a phone for billing purposes, for example. Based on the identified type of phone platform the carrier server can make determinations as to what data should be transmitted to the phone. For example, one particular phone platform may have a list of available applications pushed to the phone by the carrier server where the available application data is configured for a first type of presentation on the display of the phone, where a second type of phone (a different platform) will have a second type of presentation of the list of applications on the display screen of the phone. Generally, the phone listing of applications, or other data provided to the phone is provided to phone through a layer of communication referred to herein as the presentation layer 322.

Generally, the data or information transmitted through the presentation layer is such that it is generally configured in accordance with some type of mark up language similar to XML or HTML. Based on the list of applications displayed on the phone, a user then select an application, which could be for example application A-1. In the system 300 application A-1 resides within the carrier server, and is part of the matrix of platform specific applications. The carrier server will then transmit 322 the selected application version which corresponds to the phone platform. This transmission of the application will generally be an executable file which is loaded on the phone and executed by the phone. It should be noted that an executable file is generally a sequence of machine level code (binary instructions) or byte codes or script code, which are executed by the target processor, in this case the processor of the phone. The executable file is obtained by compiling source could which could be Java, or BREW or C++, etc. In general the executable code is a series of machine readable information, whereas the source code is generally textual and will be compiled, or otherwise processed prior to execution by the processor. If a user selects 310 a cross platform application such as A-5 for example, then the cross-platform service module 314 will transmit the cross-platform application shell to the phone 302 as a executable application code file transmission 322, and additionally the cross-platform service module 314 will provide the address for the cross-platform application file residing with the cross-platform application server 318. In the context of the discussion above, the applications can be thought of as having a component which includes executable code and another component which is the data that is incorporated into the execution of the executable code, where the data could include a wide range of different media.

Figure 4:
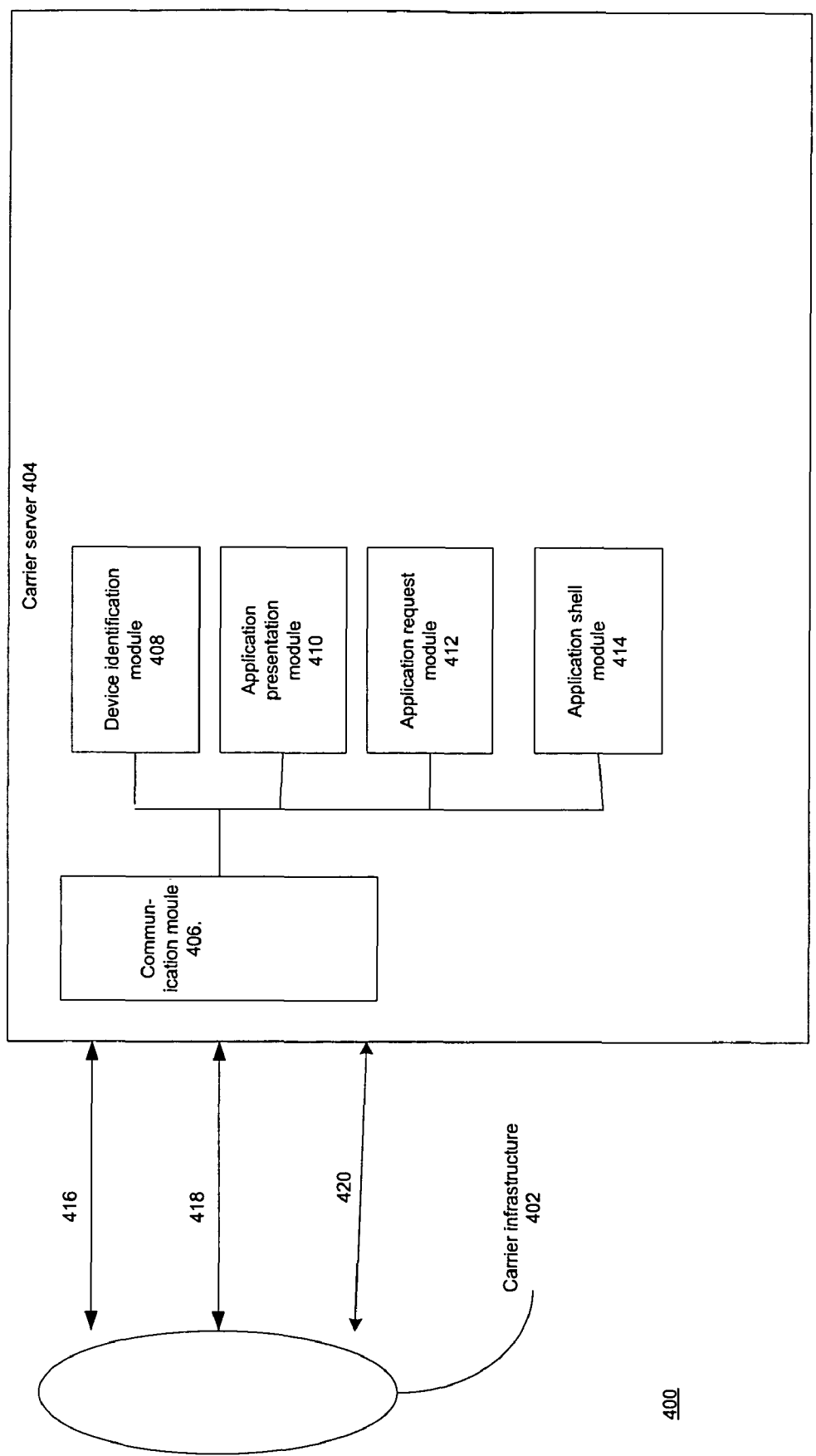
FIG. 4 shows an embodiment of a carrier server of a system of the present invention.

FIG. 4 illustrates additional aspects of a system 400, which could be implemented in the system 300 shown in FIG. 3. Carrier infrastructure would provide for transmission of data between a phone and the carrier server 404. Three different types of communication are shown in FIG. 4. However, this different communications could be received through a single communication port of the server. One type of communication 416 would correspond to a user phone requesting an initial listing of available applications, and the making of a selection for a specific application. Another communication 418 would correspond to presentation data being provided to the phone. Another communication 420 would provide for binary application type files being provided to the phone. The server 404 can contain a communication module 406 through which communication between the phone and the other modules of the server are managed. The carrier server 408 can contain device identification module which operates to identify the user and the phone which is communicating with the carrier server 404. Based on the user identification and/or other information, the device identification module can refer to a look up table or other reference table to identify the specific type of phone platform that it is communicating with. The application presentation module 410, will make determinations as to which applications are available for the phone platform and make determinations as to how to format the information so that it will be appropriately displayed on a display screen of the phone. In response to a user selecting an application for use on the phone, the application request module 412 will make a determination as to the type of application requested. If the application requested is not a cross-platform application then the user selected application can be transmitted to the user phone through a process where the file is transmitted directly from the carrier server. However, if the user selected application, is a cross-platform application, then the application shell module 414, will operate to determine if the cross-platform application shell needs to be loaded onto the phone. If the cross-application shell has not been loaded onto the phone, then the application shell module will transmit the application shell to the phone. In addition to ensuring that the cross-platform application shell has been installed on the phone, the cross-platform service module 314 will send the address of the location of the user selected cross-platform application to the phone, and subsequently the phone will use the provided address to obtain the user selected application.

For purposes of general reference, a general discussion of elements of a computer is provided herein. A general computer system is widely known, and can be implemented in a multitude of different configurations, but generally the servers discussed herein could be implemented on a range of different computer systems. These computer systems will include a communication bus to which different hardware elements of the computer are connected to provide for communicating information between the different elements. A processor is coupled to the bus and provides for processing information and generally controlling other elements of the system through communications over the bus. The computer system will also include a main memory, such as a random access memory (RAM) or other dynamic storage device, coupled to bus for storing information and instructions to be executed by processor. The main memory also may be used for storing temporary variables, such as state variable, or other intermediate information during execution of instructions to be executed by processor. The computer system also includes a read only memory (ROM) or other static storage device coupled to bus for storing static information and instructions for processor. A storage device, such as a magnetic disk or optical disk, can be provided and coupled to bus for storing information and instructions.

A display can be coupled to the bus for displaying information to a computer user. A user input device or plurality of input devices, including alphanumeric and other keys, can be coupled to the bus for communicating information and command selections to processor. Another type of user input device is cursor control, such as a mouse, a trackball, or cursor direction keys for communicating direction information and command selections to processor and for controlling cursor movement on display. The computer system also includes a communication interface coupled to bus. The communication interface 168 provides a two-way data communication coupling to the computer system to other computing systems.

In general the discussion herein referring to modules is a reference to aspects of the operation of the processor of a computer system. The processor is programmed using software to execute groups of instructions or processes, in operation or implementation collections of different processes are referred to as modules.

Figure 5:
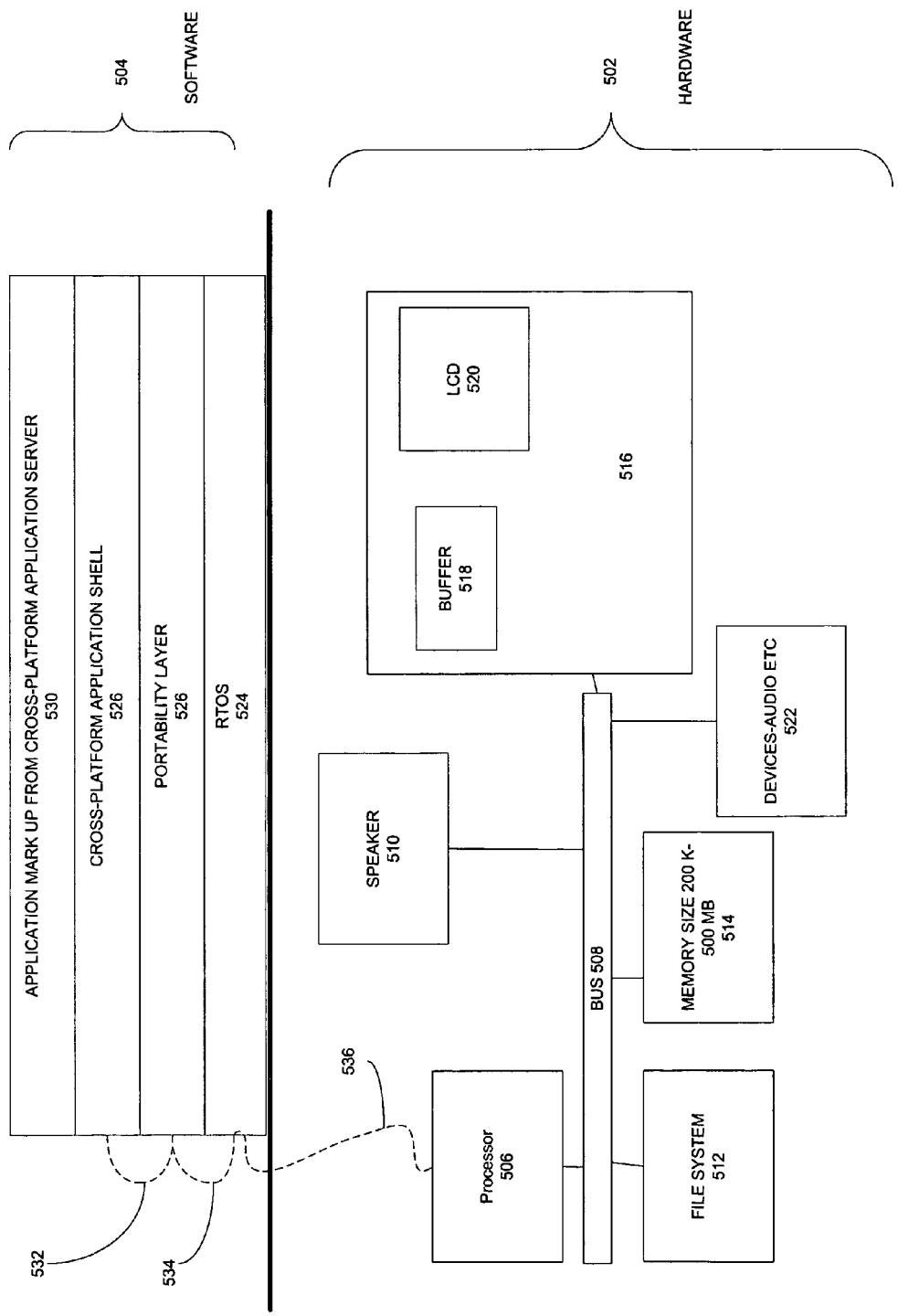
FIG. 5 shows an embodiment of wireless phone according to an aspect of the invention herein.

FIG. 5 shows an embodiment 500 of an aspect of the invention. Specifically, as shown in FIG. 5, hardware elements of the phone are illustrated in the lower portion 502 of FIG. 5. Elements of the software environment and applications running on the processor 506 of the phone are illustrated in the upper portion 504 of FIG. 5. The hardware elements of the phone include a processor 506 and generally depending on the phone platform, the processors utilized could very greatly in terms of operating parameters. For example, in phones widely used today the processors have operation speeds in the range of 50 MHz to 500 MHz. Generally the phone system will utilize a communication bus 508 to which different hardware elements of the phone are connected. The phone will also generally include a speaker 510, and preconfigured file system 512, and a RAM memory element 514. The size of the RAM memory element utilized in different phone platforms can vary greatly, and can range for example from 200 kB to 1 GB. Additionally, phones will contain a display 516. The display 516 can include a buffer memory 518 and the display can include an LCD screen 520. The properties of various displays can vary greatly for example, the color, resolution, refresh rate, and size of displays are all areas where a wide range of different properties can be found. The phone will also include other devices 522, such as keyboards, mouse controllers, or joysticks, and one or more microphones. Additionally the phone can include a persistent memory device which could be a solid state memory device, or could be a compact hard disk drive. Each of these devices can also introduce different variables in terms of the phone configuration and create different platforms, which would in past have created the need for providing different versions of applications to different phone platforms.

The software environment and applications loaded on the processor 506 are shown in area 504. At a first layer of operation in the software environment, a real time operating system (RTOS) 524 is provided. The RTOS manages basic operations and controls aspects of the actual transmission of data between the phone and the carrier infrastructure. The next software layer running on the processor is the portability layer 526. The portability layer 526 provides a basic programming language and rules for compilation, if necessary, and execution of various applications and presentation of data on the display of the phone. JME is an example of one programming language environment which is widely used on phones, and particularly in GSM type phones. BREW is an example of another widely used programming language environment which is widely used in phones, and particularly in CDMA type phones.

In a phone of an embodiment herein, a cross-platform application shell 528 is provided which runs on the processor 506 above the portability 526. The details of the cross platform application shell 528 are explored in greater depth below. However, some elements of the operation of the cross-platform application shell are illustrated in FIG. 5. One aspect of the cross-platform application shell is that it operates to obtain information about the underlying platform of the phone. For example, the cross-platform application shell 526 will query 532 the portability layer 526 to obtain different information about the different properties of the phone hardware. The portability layer will in turn query 534 the RTOS layer 524 for this information, and the RTOS will obtain 536 the underlying platform information from the processor 506, which is in communication with the other hardware components.

In response to a user selecting a cross-platform application, and using the address of the application to obtain the markup of the cross-platform application, of files residing at the address for the application, the application shell will operate to execute the application 530 such that the operation of the application is compatible with the phone platform. The markup can be thought of as including among other things media assets such as data, images, video, audio etc.

Figure 6:
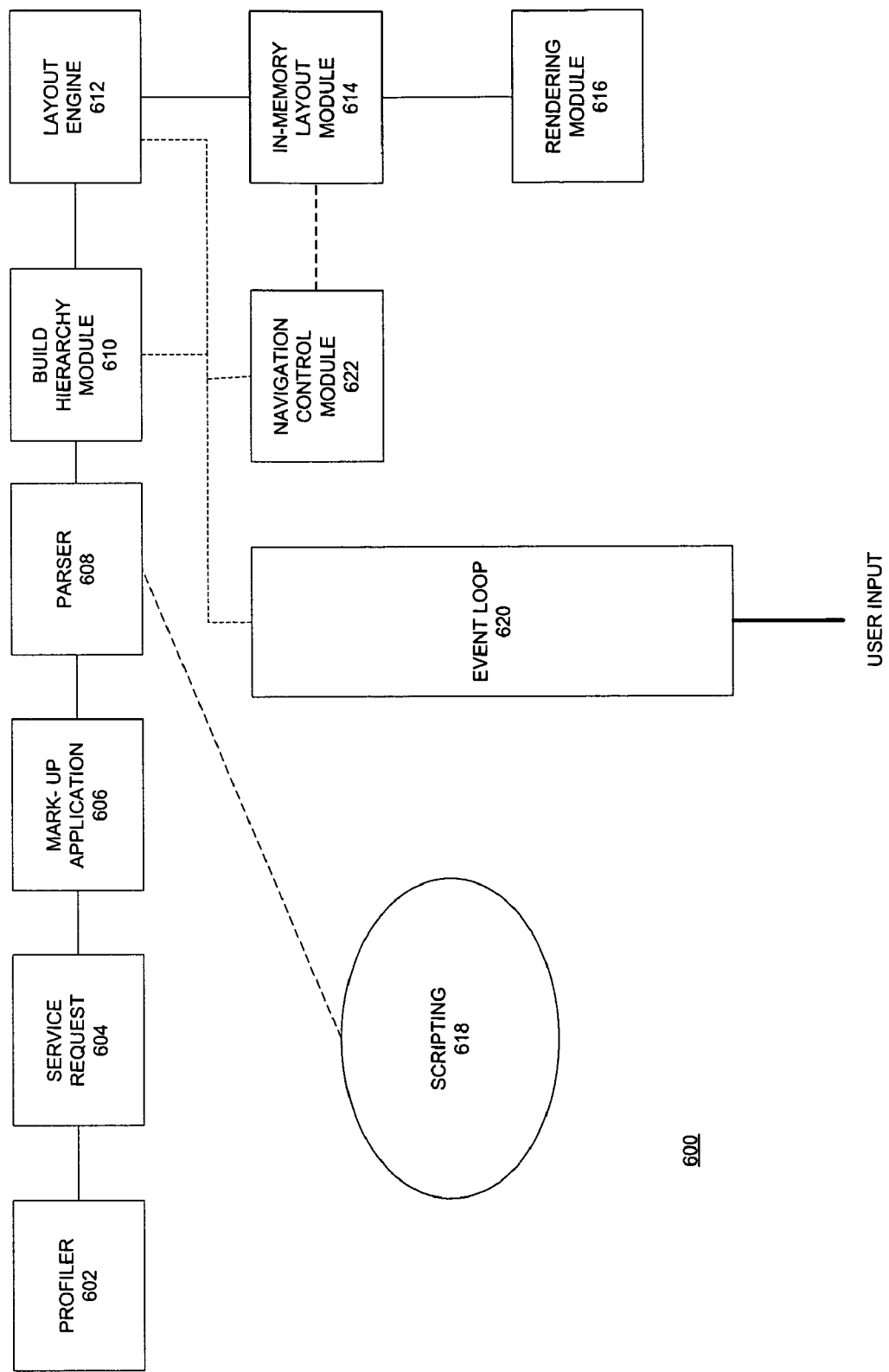
FIG. 6 shows an embodiment of a cross-platform application shell according to an aspect of the invention herein.

FIG. 6 illustrates software elements of an embodiment of a system 600 herein. These elements are primarily modules of the cross-platform application shell, with some other software elements shown to illustrate the operational relationship between different elements of the system. The cross-platform application shell includes a profiler module 602 which operates to obtain the phone system parameters. For example, the profiler module 602 can make queries to obtain screen size, screen resolution properties, system memory size, processor speed, supported media formats, software API versions and any other relevant hardware properties. The profile module 602 can then provide this information to layout engine module 612, and other modules of the cross-platform application shell where the information will be used to determine how information should be presented on the display screen of the phone, and how certain aspects of the application will be executed in the phone. Additionally, some the information obtained by the profiler module 602 can be transmitted to the service carrier server, so that the carrier server will be able to determine what format to use in terms of providing presentation layer information to the phone; for example in connection with transmitting lists of available applications or services to the phone.

The cross-platform application shell further includes a service request module 604. The service request module 604 operates to generate requests for cross-platform applications from the cross-platform application server. The service request module 604 will utilize the address for a particular user selected cross-platform application. This address is provided in response to a user selecting a particular application, which could be for example, included in a list of available applications shown on the display screen of the phone. In response the request for the application by the service request module, the application server will transmit the software code, such as markup code (including script and assets) of the application to the phone. In many embodiments, the software code will be mark-up code which provides hierarchical display instructions and rules and algorithms in the form of script code embedded in the mark-up code.

The application 606 is received by the phone, where a parser module 608 of the cross-platform application shell will parse the received application code. The parser module 608 operates to identify components of the application 606. At this point it is beneficial to consider what is meant by the term application in the context of the discussion herein. In terms of the types of applications which are generally made available in wireless phone type systems, the applications tend to be relatively simple. In one embodiment herein the applications are provide in the form of uncompiled mark-up language code. This mark-up code will typically include a number of different elements, and will provide for among other things hierarchical representation of displayable elements. For example, the widely used extended mark up language (XML) provides a suitable mark up template for use in an embodiment herein. Below some specific details of a markup language for use with an embodiment herein are discussed. The mark-up code can also include script code. This script code can include the algorithms, and rules of operation for the application, which could be for example a game. Indeed, the application could be very simple and be centered about presenting different information on a display screen of the phone. Thus, the term application as discussed herein need not be a complex collection of rules to be implemented by a processor, but can instead be a collection of mark-up code where most of the information which makes up the application is nothing more than a hierarchical collection of information to be presented on a display screen of the phone. However, it should be recognized that in the context of interacting with the information displayed on the phone, many applications will provide for some rules, or set of interactions to be followed in response to a particular user interaction with a given display of information. In the past this interaction between the phone display and the user input through the key pad or other user input device of the phone led to the need for a unique version of each application for each different phone platform used in a service carrier wireless data communication system. In some cases each of these different applications was compiled into executable code, and then transmitted to a phone which requested the particular application.

One advantage of an embodiment of the present invention is that it recognizes that for the type of applications made available through the cellular systems, the specific rules for a given application can be incorporated as script into mark-up code. This mark up code which contains the script can then be transmitted from the cross-platform application server as mark-up code which is treated by the service carriers system as presentation layer type data information, as opposed to an application which is stored and transmitted from the service carriers server, and generally will go through a screening process prior to being incorporated into the service carriers server or application decks.

Indeed, in one embodiment of the invention after the cross-platform application shell has been loaded onto a phone, when a user of the phone desires to view a list of available applications, and to select cross-platform application, the only role the carrier server plays in the process is to provide the list of the available applications, and to provide the address of the user selected cross-platform application on the cross-platform application server. Thus, the process of adding a new application to a carrier system is significantly simplified over prior systems in a number of respects. For example, only one version of the cross-platform application needs to be developed for a given service carrier system, and this cross-platform application can be utilized by the plurality of different phone platforms which are used in the service carrier wireless communication system. Another aspect of the present system is that it allows the new applications to be added to the carrier system by simply providing the service carrier with the name of the new cross-platform application and the address of the new cross-platform application on the cross-platform application server.

A parser module 608 operates to parse the received mark-up application code 606. The parsing of the received code provides for identifying hierarchical display elements of the code and for identification of various script elements included in the mark-up code. Additionally, the parsing of the mark-up code can provide for identification of variable elements which can be included in the mark-up code.

Figure 8:
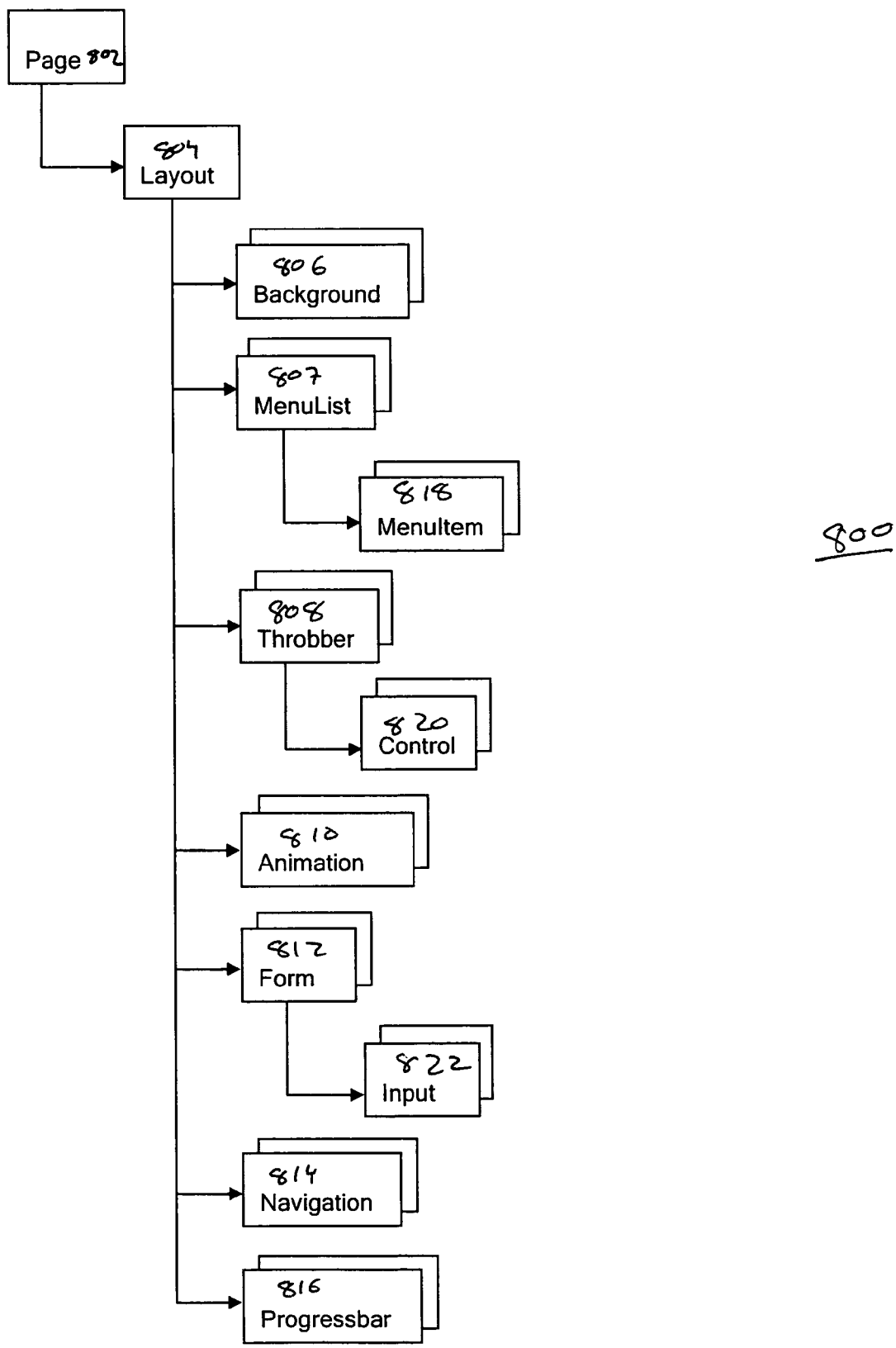
FIG. 8 illustrates an aspect of the operation of an embodiment of build hierarchy module of an embodiment herein.

A build hierarchy module 610 uses parsed mark-up code to build a display hierarchy which corresponds to the elements which are to be presented on the display of the wireless device in accordance with the operation of the cross-platform application shell with the mark-up code. For example, FIG. 8 illustrates some of the elements which could be included in a hierarchy tree 800 built by the build hierarchy module 610, where at a highest level a page object 802 is provided, and under the page object is a layout object 804. As shown under the layout object 804 the following objects are provided: a background 806, a menulist 807, a throbber 808, an animation 810, a form 812, a navigation 814 and progress bar 816. Further, additional objects at lower levels in the hierarchy can be provided, such as a menu item 818 under the menulist 807, and a control 820 under the throbber 808, and an input object 822 under the form 812. Details regarding these various objects are illustrated by discussion provided below in connection with an illustrative embodiment of a mobile markup language.

The layout engine module 612, then uses the hierarchy tree built by the hierarchy module 610, to construct a page layout. The layout engine module 612 can also use other inputs and data to construct the page layout. In one embodiment the layout engine uses graphical elements referenced in the markup to construct/render a page. The elements can include: background elements, menu elements, animation elements, navigation elements, and rendering elements, etc. In one embodiment, the layout engine can make web queries to obtain information, or data to be included in the page layout and ultimately shown in the phone display screen. The layout engine module 612 will further utilize hardware information for the phone platform (such a screen size, resolution, graphics capabilities etc.) obtained by the profiler module 602 to make determinations as to the page layout.

The layout engine module 612 will utilize the hierarchy tree generated by the build hierarchy module 610, and the other information to generate the page layout. This layout is then constructed in-memory by the in-memory layout module 614 and the rendering module 616 then generates a rendering of the images on the display screen of the phone.

In addition to the building and rendering of images on the display screen of phone, other processing modules are effectively operating in tandem with the layout engine to provide for operation of the script in the mark up code. The scripting module 618 will implement rules of the script. The parser module 608 will identify and parse the different pieces of script code included in the mark-up application code 606. The Event loop module 620 will, among other things detect the occurrence of different events, such as different user inputs by pressing on phone key pad buttons, and possibly other interaction with different input devices of the phone such as manipulation of joy stick type device, or pressing a touch screen device etc. In addition to the event loop module 620, a navigation control module 622 controls the directional movement such as moving forward or backward through a sequence of pages to be shown on the display of the phone.

Figure 7:
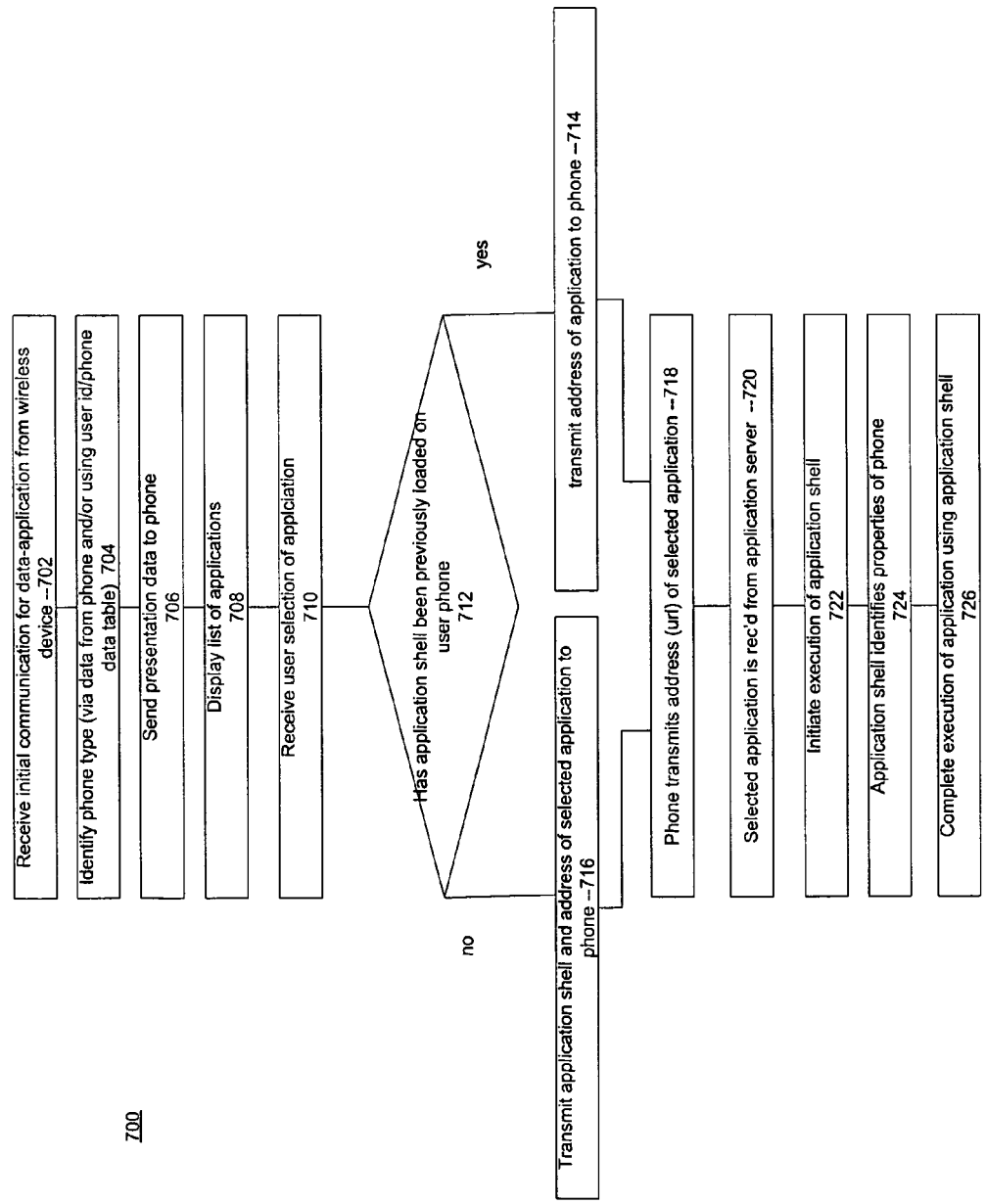
FIG. 7 illustrates an embodiment of a method of operation of a wireless system for providing cross-platform applications according to an aspect of the present invention.

FIG. 7 illustrates a method 700 of an embodiment herein. The method 700 provides for the carrier server receiving 702 a communication from a wireless phone. In response to receiving the communication from the wireless phone the, the carrier server will operate to identify 704 the type of wireless phone platform. After determination of the phone platform, the carrier server will send 706 presentation data to the wireless phone. The presentation data which is transmitted to the phone will be formatted so that it is of a layout which is be suited for the display screen for the given phone platform. The wireless phone will then display 708 the received presentation data on the display screen of the phone. One typical example of this operation will be the situation where the carrier server sends a page with a list of available applications to the phone, and the wireless phone receives the page and displays the page showing the list of available applications. The user of the phone can then use a user input device of the phone to select an application from the list of applications. The phone will transmit the user selection to the carrier server, and the carrier server will receive the user selection 710. The carrier server will make an initial determination 712 as to whether the cross-platform application is loaded on the wireless phone. In one embodiment the signal transmitted from the phone will include information indicating if the cross-platform application shell is loaded on the wireless phone.

If it is determined that the cross-platform application shell is installed on the phone, then the address of the requested cross-platform application will be transmitted 714 to the wireless phone. If is determined that the cross-platform application shell is not installed on the phone, then the cross-platform application, and the address of the user selected cross-platform application are transmitted 716 to the phone.

After receiving the address of the user selected application, the wireless phone will transmit 718 the address provided for the user selected cross-platform application, to access the selected cross-platform application. As discussed above the cross-platform application can be provided a second server which is access by the phone the interne access service provide by the service carriers infrastructure. The server with files located at the given address, will then transmit the user selected cross-platform application to the wireless phone, and the phone will receive 720 the application.

The application shell is run 722 by the processor of the wireless phone. The application shell will identify 724 the properties of the phone. The application shell will then operate to execute the running of the received user selected cross-platform application.

Figure 9:
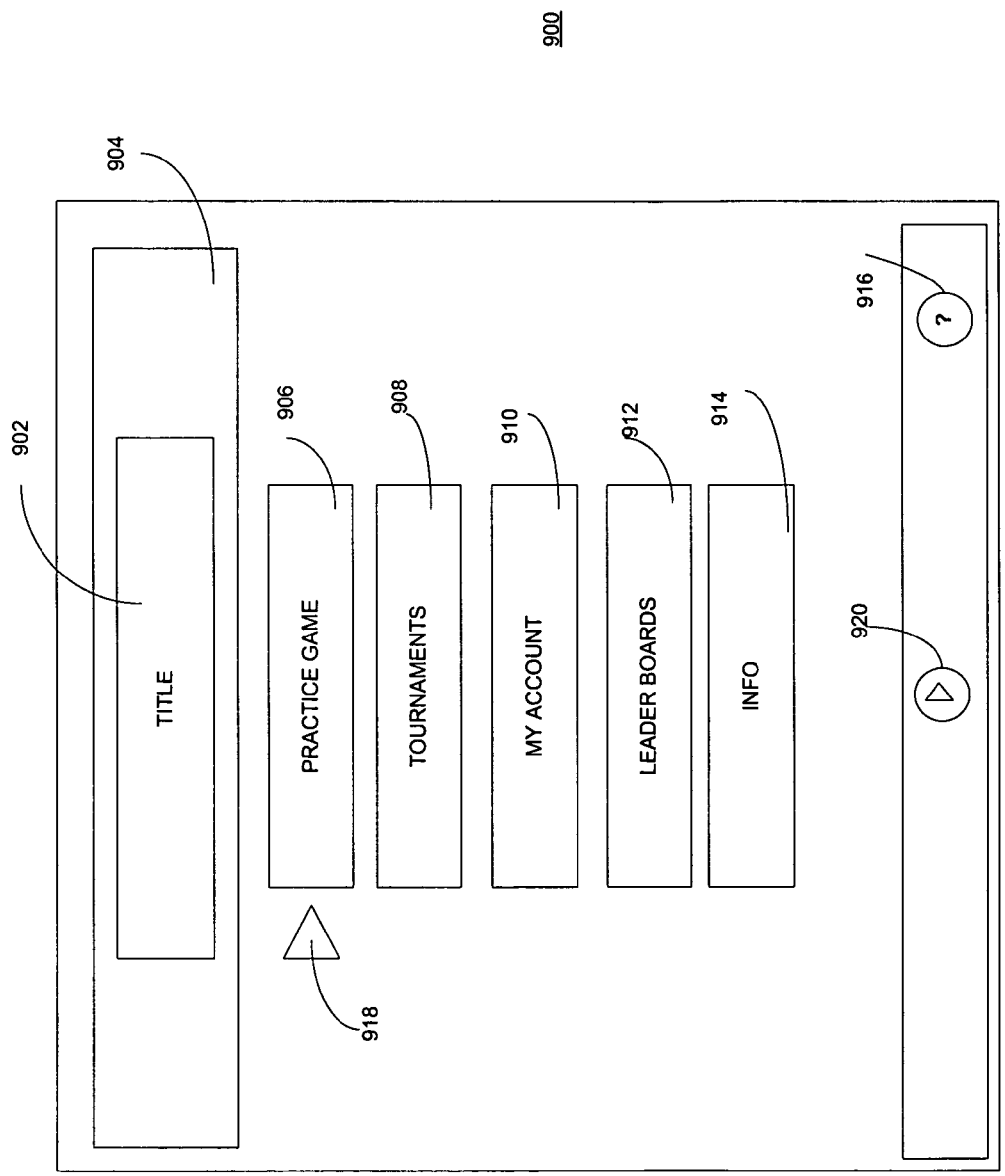
FIG. 9 shows an illustrative screen image on a display of an embodiment of a wireless phone herein.

In considering the operation an embodiment herein, it is helpful to refer to a short exemplary portion of application code, which is shown in Table A. In connection with the discussion of the code shown in Table A, reference will also be made to FIG. 9 which shows a general illustration of an image which could be generated by an embodiment of a phone herein, which is loaded with a cross-platform application shell according to an embodiment herein.

TABLE A

```
1-<?xml version="1.0" encoding="US-ASCII"?>
2-<!-- Layout markup to control presentation layer -->
3-<!-- SkillJamMobile Home page -->
4-
5-    <layout>
6-       <background id="home" image="tit.${ImageExt}" position="top" horiz-align="center" vert-align="top" 7-
         z-index="0" />
8-       <background id="stripe_1" image="str_1.${ImageExt}" position="top:home.bottom" horiz-align="center"
9-         z-index="0"/>
10-      <menulist id="modeselections" cursor="cursor.bmp" c-placement="left" position="top:stripe_1.bottom"
11-        style="vertical" horiz-align="left" gap="0" z-index="1">
12-         <menu id="sin_mod" image="pra.${ImageExt},pra_hi.${ImageExt}"/>
13-         <menu id="tou_gam" image="tou.${ImageExt},tou_hi.${ImageExt}"/>
14-         <menu id="my_acc" image="my_acc.${ImageExt},my_acc_h.${ImageExt}"/>
15-         <menu id="lea" image="lea_boa.${ImageExt},lea_b_h.${ImageExt}"/>
16-         <menu id="inf" image="inf.${ImageExt},inf_hi.${ImageExt}"/>
17-      </menulist>
18-
19-      <background id="stripe_2" image="str_2.${ImageExt}" position="top:modeselections.bottom"
20-        horizalign="center" z-index="0" />
21-      <background id="navbar" image="navbar.${ImageExt}" position="bottom" horiz-align="left"
22-        z-index="9"/>
23-
24-      <menulist id="play" position="bottom-1, left+75" type="select" style="horizontal" gap="36"
25-        z-index="10" default="playbtn">
26-         <menu id="playbtn" image="pla_btn.${ImageExt},pla_b_h.${ImageExt}"
27-          url="${Click.id}.mml"/>
28-         <menu id="helpbtn" image="hel_btn.${ImageExt},hel_b_h.${ImageExt}" url="gen_hel.mml"/>
29-      </menulist>
30-
31-      <navigation key="$Select.homebtn"/>
32-      <navigation key="$Select.helpbtn"/>
33-
34-      <navigation key="$Click.sin_mod" url="${Click.id).mml"/>
35-      <navigation key="$Click.tou_gam:$LoggedIn" url="tou_gam.mml,login.mml" args="${Click.id}"/>
36-      <navigation key="$Click.my_acc:$LoggedIn" url="my_ acc.mml,login.mml" args="${Click.id}"/>
37-      <navigation key="$Click.lea" url="${Click.id}.mml"/>
38-      <navigation key="$Click.inf" url="${Click.id}.mml"/>
39-      <navigation key="back" url="$Exit"/>
40-    </layout>
41-
```

The generalized illustration of an exemplary display image 900 shown on the screen display of a wireless phone, corresponds to the cross platform application code shown in Table A, herein. The image 900 corresponds to a screen page, which is defined by the code starting at line 4 and ending at line 41. This code in Table A, illustrates a number of the elements of an embodiment of the invention herein.

One aspect of the code is that it does not contain any specific instructions as to the position of the different image elements to be shown on the display. For example, line 6 of the code defines the virtual position, or relative position, for the title block 902 shown in the image 900. The virtual position of the title is defined by the text of line 6 of the code which states:

"position="top" horiz-align="center" vert-align="top" z-index="0"

This type of element of the code is referred to herein as a virtual position tag. The virtual position tag operates to define the position of a given display element relative to a virtual page. The actual page layout and specific positioning of different elements of the page is not determined until the code of Table A has been processed by the layout engine module of the cross-platform application shell, and the shell will operate to provide for a compilation of the code of Table A, and this compilation will incorporate the actual screen phone dimensions and other phone platform properties into the compilation of the code so that the virtual interface, or virtual image, defined by the cross-platform application code of Table A, is instantiated as a physical representation in compiled code which can then be rendered on the screen on the phone; where the physical representation provides physical positioning dimensions, or actual physical positioning coordinates for the display or image elements to be shown on the display screen. These physical positioning coordinates could for example specify pixel positions for given image element to be shown in a page on the display screen. For example, in one given phone platform with a relatively small and low resolution display, the position of a title heading would in terms of physical position on the display, and in terms of pixel coordinates in the display, be very different than the position of the same title heading on a different phone platform with a larger higher resolution display, even though the two different phone platforms area actually running the cross-platform application code.

One of the background elements of the page, element 904, is identified as "stripe_1" at line 8 of Table A. Further, the position of the stripe_1 element is defined on line 8 of Table A by the virtual position tag which begins at line 8, and states:

position="top:home.bottom" horiz-align="center" z-index="0"/>

This virtual position tag operates to define the position of element strip_1 relative the previously defined element "home". Further, as shown by the hierarchical code layout of Table A, each subsequent display element, such as elements "modeselections" of line 10, and "stripe_2" of line 19, for example, also contain virtual position tags which define the virtual position of one particular element relative to another element of the page.

Thus, the cross-platform application code of the Table A, illustrates that the code provides for a virtual interface, or virtual page layout, but does actually provide any specific position information, such as specific dimensional parameters controlling where an element is shown on the display screen. Using the virtual position tags, allows for implementation on a wide range of phone platforms, where the cross-platform application shell will operate to identify the particular phone platform properties, and then incorporate these properties into the cross-platform application code, during the execution of the application code. For sake of a more complete illustration it is noted that display elements 906, 908, 910 and 912 are defined as menu items at lines 12, 13, 14, 15, and 16.

The versatility of the of cross-platform application code is further illustrated by referring to element 916 of the image 900. The element 916 is a help button which is defined at line 28 of the cross-platform application code, where the definition of the image element used for the help button is a virtual icon element, where the virtual icon element provides that at runtime of the application, the layout engine can use the profiled platform properties to make a determination as to which of the available icon display elements, or image elements, for a given phone platform can be used as a help button icon. In most instances a phone platform will be provided with a set of supported display images for the phone platform. Thus, the cross-platform application shell can be written with include a set rules which specify the image element to use for a given phone platform with a specific set of supported display images.

The terms display elements and image elements as used herein are synonymous and refer to the different parts of the image shown in a page which is presented on a display screen of the wireless phone. Examples of image elements would include different icons, such as help symbols, and other symbolic icons which can be included in a page which is shown on a display screen; and image elements could include more general elements shown on a display such as background areas provided for highlight different areas shown in page; and image elements could also include different title headings, and other images which are displayed in a page shown on a display screen as part of the running of an application.

The determination of what display element to use for the help button icon, is one that only needs to be made once for a given application runtime execution. This element is in effect a state variable, and once it has been defined the processor of the wireless phone will cache the determined value, as a state value in memory, and the application will continue to run and use the determined state value for the variable during the running of the application. Thus, when the variable icon tag occurs at subsequent points during the running of an application, the variable will already have been defined and the cached state value can be used by the application with out needing to refer back to the platform profiling information. As used herein the running of an application, is a reference to the phone processor operating to implement the instructions of a given application, or other software code instruction. This running of an application could include implementing instructions which are provided in a range of different types of software including binary code or high level source code. The process of running the application may require compiling the code, or for lower level code, compiling might not be necessary. Indeed, depending on the circumstance compilation can be static, dynamic, and in some cases will not required. In some instances the code might be converted from source code to byte code and the compilation process could be implemented on sequential or just in time basis.

Another aspect of the code is illustrated for example at line 38, of Table A, which provides that if the navigation key element 918 is positioned at the "info" element 914, and then clicked then the operation of the application will proceed to a specified url address. However, in the example of a card game type application, as discussed in connection with FIG. 10, if a the click were to occur in connection with an "enter" button shown on the display screen, then a pointer in the mark-up code would point to a script module. The script module would include rules and algorithms of the card game. In one game application when the user clicks on a "enter" button, a script element would be implemented which would call for dealing the player another card. In response to the dealing of another card, additional rules of the game would be implemented, and the image shown on the display screen would be modified to reflect the effect of dealing the additional card.

Figure 11:
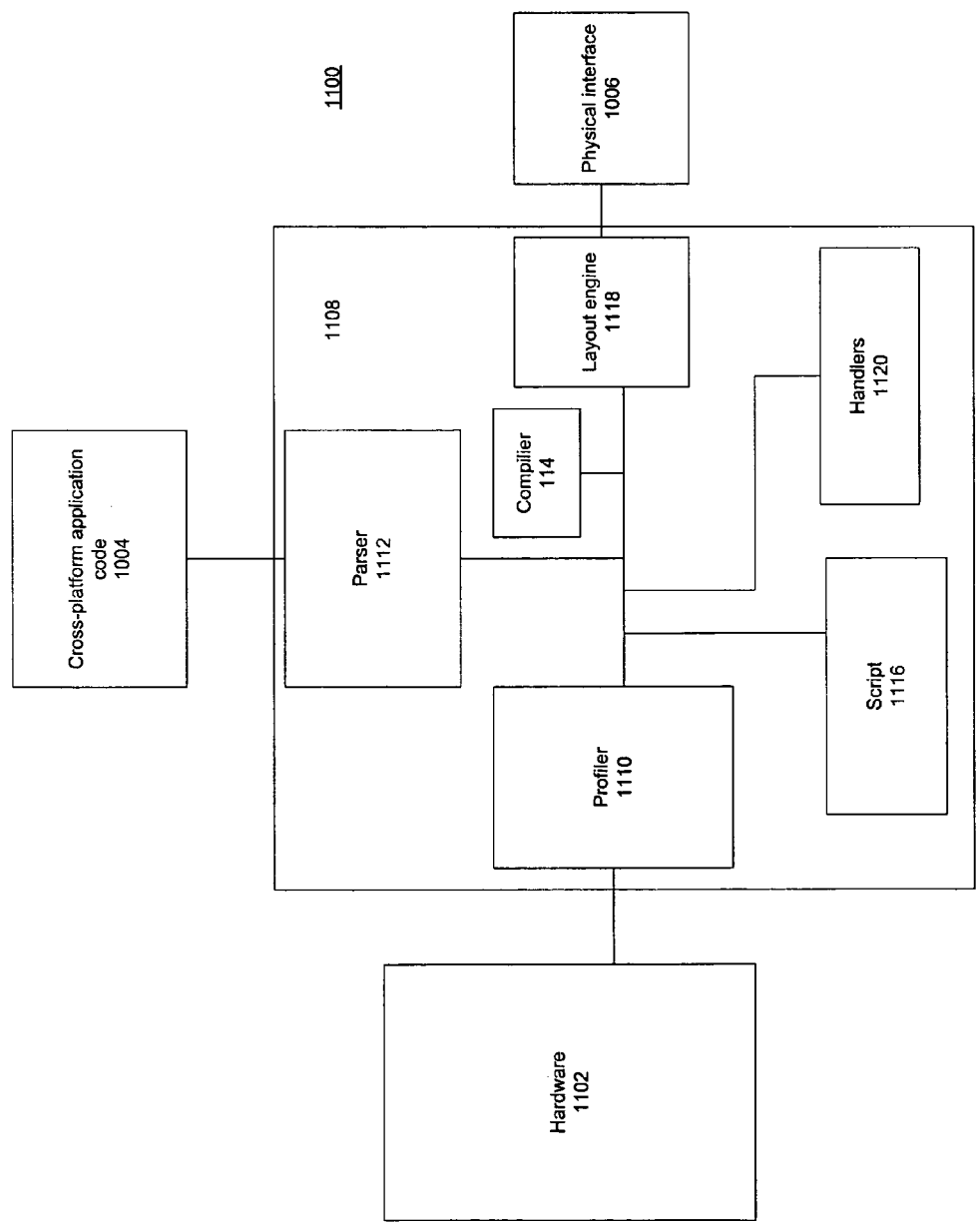
FIG. 11 illustrates the operation of different modules of an embodiment of a cross-platform application according to an embodiment herein.

FIG. 11 illustrates another aspect of an embodiment 1100 herein. The hardware 1102 of the phone platform is identified and characterized by the profiler 1110 of the cross-platform application shell 1108 running on the processor of the phone. The parser 1112 of the application shell operates to parse the cross-platform application code 1104. The cross platform application provides a virtual interface for the application, and the parsing of the code provides for the identification of the virtual location tags, and the virtual icon tags using state variables, and the script code of the cross platform application code 1004. A compiler module 1114 of the application shell, then operates to compile the parsed code, and during compilation process the variable elements identified in the parsed code are fixed using the actual parameters of the device. The compilation process can also provide for compilation of the script code 1116 embedded in cross-platform application code 1004. The compiler can operate in conjunction with the layout engine 1118, and the layout engine then builds the actual page layout, which is then rendered as physical image; or interface, on display screen 1006. Handler objects or modules 1120 then detect user input and other events which are used as inputs to the running of the application.

Figure 10:
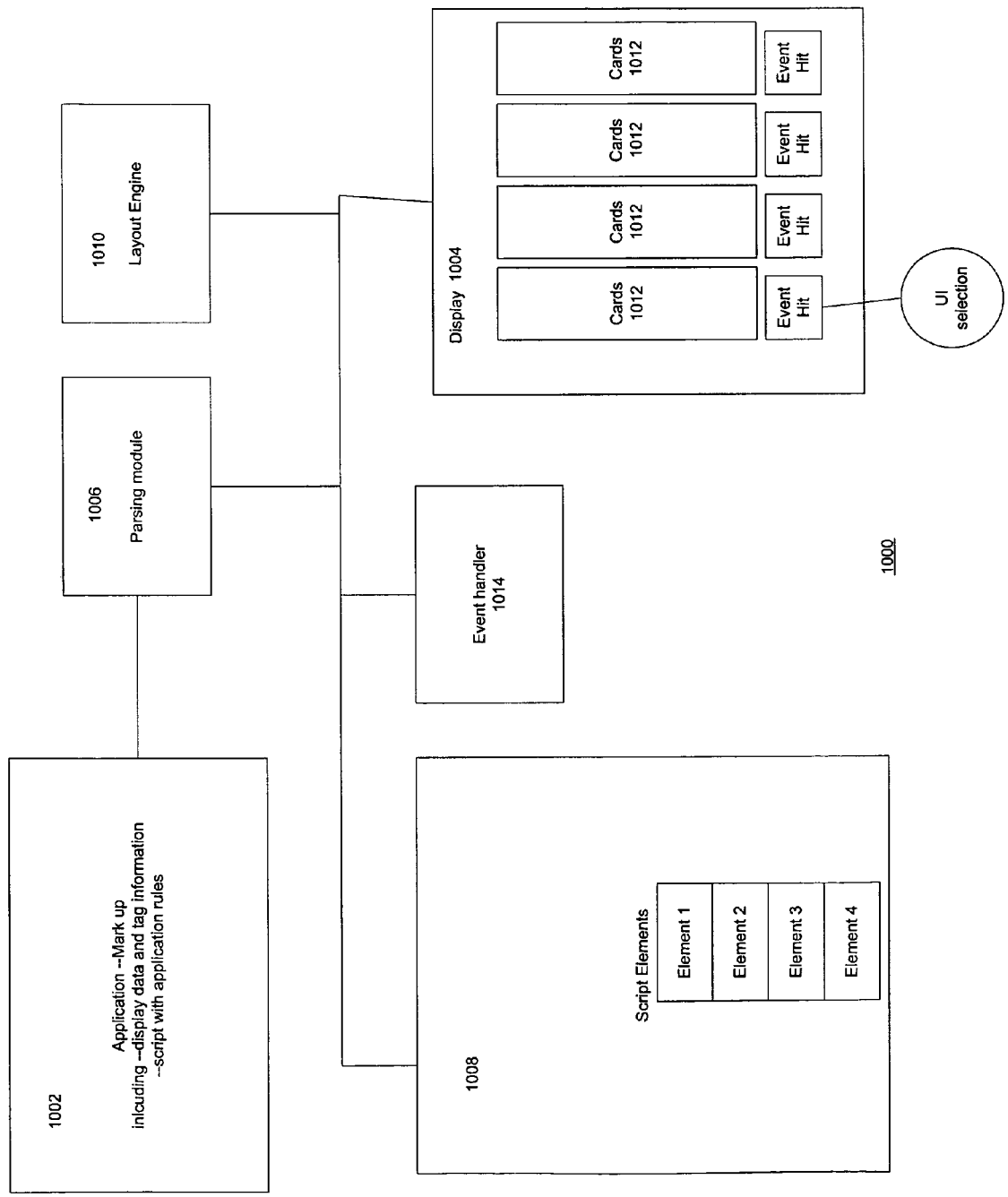
FIG. 10 illustrates the operation of elements of a system in connection with running a game application on a wireless phone.

FIG. 10 illustrates aspects of an embodiment 1000 of the operation of the cross-platform application shell in a wireless phone. It should be noted that while not all of the modules shown in FIG. 6 area shown FIG. 10, this not meant to imply that these modules are not present in the embodiment 1000; rather certain selected elements are shown in embodiment 1000 to facilitate further discussion and explanation of the operation of the cross-platform application shell. The application mark-up code 1002 is compiled using the elements or modules of the cross-platform application shell during execution of the application. In this manner the application mark-up code provided by the cross-platform application server and the cross-platform application shell are combined to create an actual operational application where the operation of the application is evidenced by the actual display of the application pages on the display screen 1004. As previously discussed the parser module 1006 acts to parse the application mark-up code. During the parsing elements, such as rules and algorithms of the script code are identified. These identified script elements are shown in a script module 1008 of the phone.

The layout engine module 1010 will then use the parsed mark-up code and elements from other modules of the cross-platform application shell to build a page layout for the application. Note that in an embodiment herein the cross-platform application mark-up code does not include any wireless phone platform specific code. Instead of relying on platform specific code in the application code 1002, the layout engine 1010 utilizes wireless phone platform information obtained by the profiler module 1006. This platform information can include screen size information, memory size, file structure, user input device information etc. Based on the platform information the layout engine 1010 determines how to construct the page layout such that it is compatible with the particular wireless phone platform. Given, that specific layout determinations are made during the actual runtime execution, or compilation, of the application, specific layout determinations and operational rules as provided in script code can not be physically integrated with each other prior to actual determination of the specific device platform. In the case of the cross-platform applications, then application mark-up code, and script code therein, must be configured for operation on a virtual device, and then during the actual runtime operation on the wireless phone, the cross-platform application shell modules will then act to execute the application by providing the actual device parameters necessary to implement actual execution of the application.

In FIG. 10 for example, consider the image shown in the display 1004. The image roughly corresponds to an application page which could be a card game for example. Each column 1012 corresponds to a group of cards, and when a user manipulates a user interface device of the phone to make a selection in connection with a button labeled "enter". The selection of the enter button will then result in another card being added to the column of cards which corresponds to the selected "enter" button. On each of the various phone platforms the specifics of the implementation of the application will vary. For example, the user selection devices, could span a range of different devices; ranging for example from making a selection on a touch screen display to using a joystick type input device, to pressing a specific key pad on a keyboard type of the device. Further, the positioning and sizing of the different elements shown in the display 1004 can change based on the properties of the various phone platforms. Thus, when the game application page shown in display 1004 is rendered on one phone display the "enter" button could be displayed as a rectangular button icon in a magenta color, which in a different phone platform the enter button might be displayed in slightly different position with the enter button positioned immediately adjacent to a given card column, as opposed to being positioned immediately under the card column, and further the button might also be displayed in some shape other than a square or rectangle.

In terms of execution of the application, when a user makes a selection on one of the "enter" buttons, then the event handler module will handle the event, and in conjunction with other objects or modules of the cross-platform application shell, a determination will be made as to what interaction user event occurred, which in this case would be the selection of one of the enter buttons, in this case the event handler having determined that a particular enter button was selected might send a signal which would initiate the scripting element 1 for example of scripting module 1008. This element could then provide for the addition of another card to the column of cards corresponding to the selected enter button. The layout engine module 1010 would then generate a new page layout corresponding to the addition of a card to the corresponding column of cards. This new page layout would be generated so that it was compliant with the particular wireless phone platform.

Figure 12:
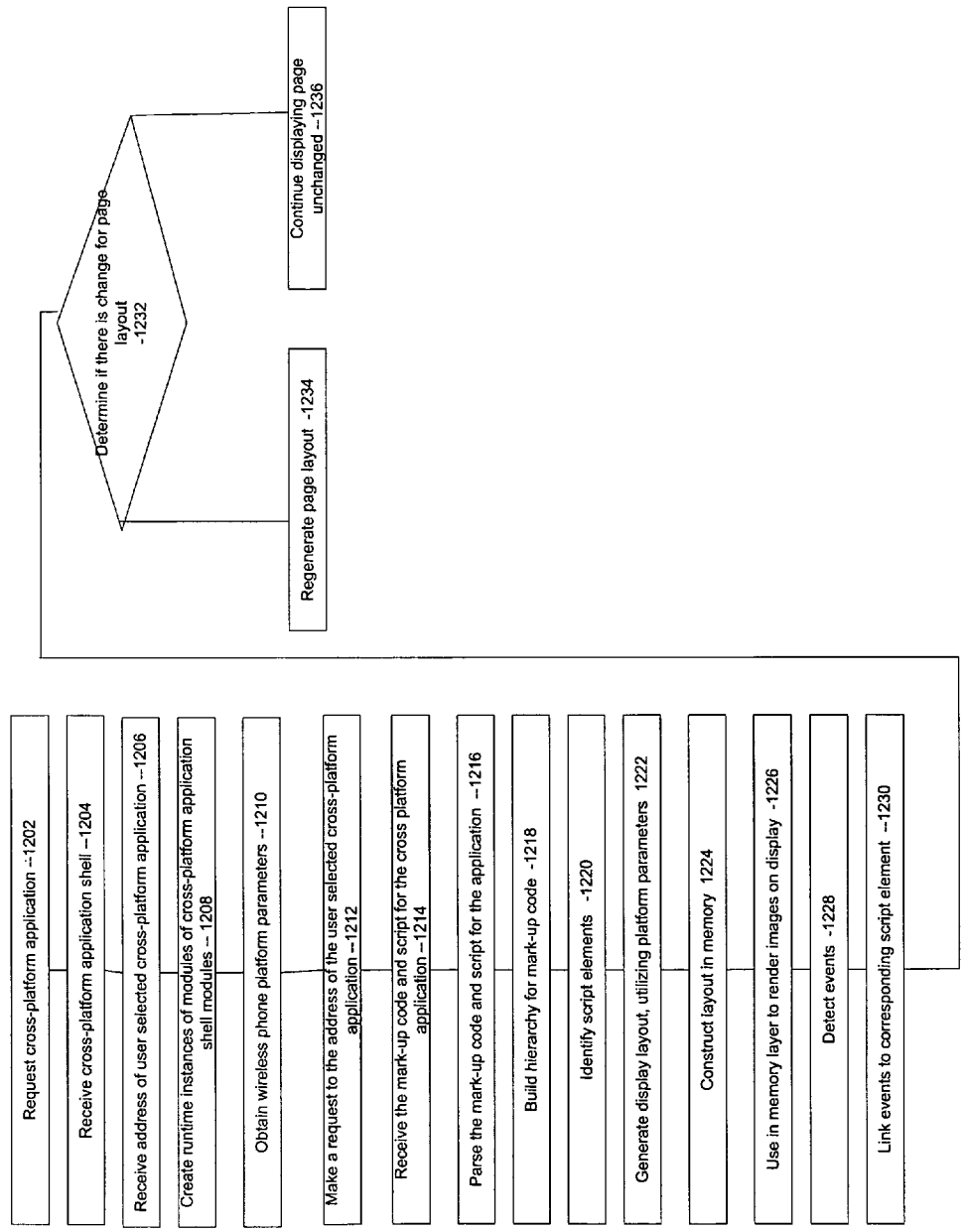
FIG. 12 illustrated an embodiment of a method of operation of a wireless phone system.

FIG. 12 shows an embodiment of a method 1200 herein. The method 1200 illustrates aspects of the method operation of a wireless phone herein. In operation the phone can transmit a request 1202 of a user selected cross-platform application. The phone will receive a 1204 cross-platform application shell. The phone will also receive 1206 and address for the requested cross-platform application. The processor of the phone will run the cross-platform application shell, which can include creating 1208 runtime instances of the modules of the cross-platform application shell. The wireless phone platform parameters, are obtained 1210 for use during the execution of the cross-platform application. The wireless phone makes a request to the address provided for the user selected cross-platform application 1212. In response to the request made to the address, the phone receives 1214 the mark-up application code and script for the cross-platform application.

The received mark-up application code is and script is parsed 1216. The parsed code is used to build 1218 a display hierarchy. The script element to be used during the running of the application are identified 1220. The parsed code and hierarchy can then be used to generate 1222 a display layout. The generation of the display layout can also include using the phone platform parameters to make determinations as to the actual physical layout of image elements, which will provide a physical implementation of the virtual page defined by the cross-platform application code. The generated display layout is then constructed 1224 in the display memory, and the display memory is used to provide the rendering 1226 of the page image on the display screen.

Runtime application events are detected 1228 and these events are then linked 1230 to appropriate commands, or script elements. In conjunction with or following implantation or a command or script element, a determination 1232 is made as to whether there is a need for a change in the page layout. If it is necessary the page layout is regenerated 1234 in the correct depth (z) order, and if it is not necessary the page layout will continue to be displayed without change.

In one embodiment a markup language referred to herein as a mobile markup language (MML) is used. An illustrative embodiment of an MML is described in more detail below. MML can be used as a language for describing the mobile presentation layer using XML as the underlying document and transport framework. A hierarchical object representation is used to describe presentation elements of a typical mobile "page". These elements describe a virtual abstraction of the target device (e.g. phone), so the same markup can be presented to all J2ME and BREW devices. In addition to describing an application's graphical layout, MML also integrates different media types, navigation control, animation objects etc. The ultimate goal of MML is to be the language binding within a client-server architecture to provide a device independent presentation and navigation layer to efficiently deploy rich, dynamic and user engaging mobile applications.

Some of the common presentation elements utilized by MML can include; background image elements; menu elements; and animation elements. Some of the MML supported media elements include: different image formats (JPG, PNG, BMP); different audio formats (MIDI, WAV, MP3); different video formats (MPEG, AVI); and other formats such as (FLASH).

A compact built-in scripting language can be employed which allows for an extension to the MML framework to provide an interpretive language binding that can be used to implement "arbitrary" custom rules for how the presentation and media elements interact with the user.

The MML language syntax hierarchically describes a collection of layout, navigation and access elements. Discussion is provided below for different hierarchical elements, and their usage, arguments and parent-child relationships, for an illustrative MML embodiment.

1.

Description: This is a generic page identifier to name a page.

Arguments:

id="name"

prefetch="pathname list" //comma separated list of URL pathnames or a wildcard regular expression
expire="time" //specifies expiration time
history="include|exclude" //include/exclude this page to URLHistory
cache="on|off" //resource elements of this page are cached/not cached 2. <layout>

Description: This element describes the page layout hierarchy.

Arguments:
audio="name"
play="$Onload|$Select|$Click"
progressbar="on|off"

a. <throbber>

Description: This element describes a throbber animation object.

Arguments:
id="name"
framerate="number"
frames="number"
image="name" //flip thru' images
position=""{top|bottom}: <id>.{top|bottom} {+−}<number>", "{left|right}: <id>.{left|right} {+−}<number>"
horiz-align=""{left|right|center}: <id>"
vert-align=""{top|bottom|center}: <id>"
z-index="number"

i. <control>

Description: This child element provides control for the throbber object.

Arguments:
    loop="start, delta"
      start="number" //seconds
      delta="number|$OnKeyPress"

b. <background>

Description: This element describes page background objects.

Arguments:
id="name"
text="name"
color="32 bit RGB value"
mode="multiline|singleline"
image="name"
fill-rect="width, height"
fill-mode="none|flat|gradient"
fill-colors="color0, color1, color2, color3" //Is relevant only if fill-mode is not "none". If fill-mode="flat", "color0" (single color) is used to flat fill the rect. If fill-mode="gradient", all four colors are interpreted as the rect's vertex colors and a 2D gradient fill is performed
position=""{top|bottom}: <id>.{top|bottom} {+−}<number>", "{left|right}: <id>. {left|right} {+−}<number>"
horiz-align=""{left|right|center}: <id>"
vert-align=""{top|bottom|center}: <id>"
horiz-limit=""<id>.{left|right} {+−}<number>" //horizontal limit of bkg rect
vert-limit=""<id>. {top|bottom} {+−}<number>" //vertical limit of bkg rect
z-index="number"

c. <menulist>

Description: This element describes a list of child menu items within this menu list.

Arguments:
id="name"
position=""{top|bottom}: <id>. {top|bottom} {+−}<number>", "{left|right}: <id>. {left|right} {+−}<number>"
horiz-align=""{left|right|center}: <id>"
vert-align=""{top|bottom|center}: <id>"
horiz-limit=""<id>. {left|right} {+−}<number>" //horizontal limit of menulist rect
vert-limit=""<id>.{top|bottom} {+−}<number>" //vertical limit of menulist rect
gap="number" //gap between successive menu items
style="horizontal|vertical|grid: <horizontal|vertical>|table" //"grid" can additionally specify a "horizontal" or "vertical" attribute to indicate scrolling preference.
cursor="image name" //Cursor image
c-placement="left|right|top|bottom" //cursor placed {left, right} of menu item list if style is vertical; cursor place {top, bottom} of menu item list if style is horizontal
c-offset=""{+−}<number>" //relative offset w.r.t to menu item positioning
border="color, number" //border color and border line width
audio="pathname" //audio playback on menu item select
z-index="number"
type="select|click" //if "select" this menulist is the select object
text-hilight="box|color" //mode for text hilight: box-> text select has a box background and a foreground highlight color; color-> text select is just the foreground highlight color
variable="name-list" //typically, "name-list" will be an expansion of a special variable—e.g. $name, which may expand to something like: {id1, text1; id2, text2, id3, text3, idn, textn}. The individual <id, text> pairs fill in the respective menu item's id, text fields.
default="id" //default selection identified by menu id. A special case of id="$None" indicates that there is no default selection for this menu list. This is most useful when multiple menu lists are created, where menu items of all menulists get chained together as though they were one large menulist. This allows menu items (in groups) to have different size images i. <menu>

Description: This child element describes a menu item within the parent menu list.

Arguments:
    id="name"
    text="name"
    color="32 bit RGB value, 32 bit RGB value" ///2 argument refers to highlight color
    image="name, name" //$2^{nd}$ argument refers to highlight image
    button="stop|play|pause|purchase"
    select="include|exclude" //include/exclude this item in the select list
    url="pathname, pathname" //the $2^{nd}$ argument is optional and is used when a dependent navigation condition fails
    object="name, pathname" //the $2^{nd}$ argument is optional and is used as a URL when a dependent navigation condition fails d. <form>

Description: This element describes a form object that encapsulates "input" objects Attributes:
id="name"
type="visible|hidden"
position=""{top|bottom}: <id>.{top|bottom} {+−}<number>", "{left|right}: id>.{left|right} {+−}<number>"
horiz-align=""{left|right|center}: <id>"

vert-align="{top|bottom|center}: <id>"
horiz-limit="<id>.{left|right} {+-}<number>" //horizontal limit of form rect
vert-limit="<id>.{top|bottom} {+-}<number>" //vertical limit of form rect
gap="number" //gap between successive input elements
placement="horizontal|vertical"
z-index="number"
service="pathname" //service URL to submit form
persistent="true|false" //state returned by service persists across pages (or not)
encode="base64|MD5|none"
box="color, color" //box color; $2^{nd}$ argument is highlight color
i. <input>
Description: The element describes a user input object
Attributes:
    id="name"
    text="name" //this is the display label associated with this element
    name="name" //name of name-value pair submitted in POST
    color="32 bit RGB value, 32 bit RGB value" //colors are: textColor, textHilightColor
    edit="value" //typically filled via user input; if form.type==hidden, this can be directly set
    image="name"
    type="text|password"
e. <animation>
Description: This element describes animation for a selected image object
Attributes:
id="name" //element ID
time="start,delta"
    start="onload|$Select|$Click|number"
    delta="number"
framerate="number"
numframes="number"
loop="forever|$Select|$Click|number"
transition="color0, color1, ..., colorN" //color=rgb in the form 0x[alpha,red,green,blue]. Color transition of element.
move="coord0, coord1, ..., coordN" //coord=normalized (x,y) coordinate in the range [-1.1]. List of coordinates that specify a path for element.
image="name" //flip thru' images—name extended by frame#
f. <progressbar>
Description: This element describes a progressbar object that provides visual feedback on a "player" playback.
Attributes:
id="name"
position="{top|bottom}: <id>.{top|bottom} {+-}<number>", "{left|right}: <id>.{left|right} {+-}<number>"
horiz-align="{left|right|center}: <id>"
vert-align="{top|bottom|center}: <id>"
color="32 RGB value, 32 RGB value" //fill color, box color in 0x[alpha,red,green,blue] form
width="frac_number" //in the range [0.1]
height="frac_number" //in the range [0.1]
z-index="number"
g.
Description: This element describes a navigation object to control navigation to subsequent pages.
Attributes:
key="back|$URLload|$Select.<id>|$Click".<id>: "$Credits $Subscription $SpecialVariable'" //key condition: dependent on
args="arg0, arg 1, ..., argN"
action="purchase|refresh"
url="pathname, pathname" //$2^{nd}$ argument taken when dependent condition fails
object="name, pathname" //the $2^{nd}$ argument is optional and is used as a URL when a dependent navigation condition fails
submit="$Input, $Conditional" //Submits all the input elements of all forms. If $Conditional is optionally present, the submit (POST) operation will only occur if the key condition is true. This implies that the key attribute has a dependency constraint. In this case, the key dependency condition is checked BEFORE the post, otherwise the condition is checked AFTER the post.
local="listInstalled:arg1, arg2, ... argn) deleteInstalled: arg1, arg2, ... argn"
delay="number" //in milliseconds In the above discussion of various hierarchical element of an MML embodiment, a number of different symbols and specific instructions are utilized, and a range of other potential elements of an MML could be utilized. For purposes of general illustration various aspects of the MML described are above are detailed below.

Symbols that start with "$" refer to special run-time events or other keywords. $Select -> corresponds to a user selected item to control navigation. $Click -> corresponds to a user clicked item. $Select.id, $Click.id reference specific menu item identifications (ids). This usage allows specific navigation control based on user selection. For example, one control can use a key="$Select.id1" that includes a form submit, whereas another key="$Select.id2" could directly go to the selected URL upon select. $SpecialVariable' is a name within the query string returned from a POST (login, game score update, configuration service etc). This string is an '&' separated list of name-value pairs, expressed as name=value.

Different dependent conditions can be provided for as follows:
  a. $Credits
    i. Current credit count
    ii. Navigates to "URL[0]" if $Credits >0 else to "URL[1]". Also decrements $Credits if successful.
  b. $Subscription
    i. Current subscription state
    ii. Navigates to "URL[0]" if subscription is active and current else to "URL[1]".
  c. '$SpecialVariable'
    i. Name extracted from the Special Variables list
    ii. Navigates to "URL[0]" if $SpecialVariable=="true" else to "URL[1]".

$Input -> corresponds to a shorthand notation to include all input data (usually for a submit). Navigation action="refresh" refreshes the current page. This is equivalent to the page expiration condition. The primary purpose of this option is to allow the user to force synchronizing with a server.

For submit command, the "ids" can refer to specific Form IDs. These can be grouped together to perform multiple submits. The submit command is a post to a service URL, which is derived from the Form's service element. Additional name-value pairs can be added to the submit/post command by explicitly adding them following a "?". An example could be something like:
submit="$Input?sessionid=$Sessionid&foo=bar"

$Onload-> can be used to indicate a trigger at page onload.

Argument passing can be done via the "args" attribute of the navigation object. Arguments are referenced in the form "${args[n]}", where "n" is the argument index in the range [0 ... max]. $Sessionid can be included as an arg element, which expands to a specified sessionid. Referenced arguments are expanded at run-time.

Z-index numbering is in the range [0 ... max], where 0 refers to a layer in the background and max refers to a layer in the foreground. Object rendering is done back to front based on the z index.

All URLs are derived by concatenating the immediate URL pathname to a base URL. By default all URLs are accessed via a http protocol. If the URL pathname field starts with "//" then the URL is accessed locally.

The time expiration field's time format is expected as a long, expressed in milliseconds representing the time since Jan. 1, 1970. When a page has expired (current time is past expire time), the page is made "current" by invalidating any cache versions and fetching the version via http. Any other cached references in the page are also invalidated and similarly made "current". If the value of the navigation.key equals "refresh", the current page is unconditionally made current.

All elements except  and <layout> grow as a list, though it may not make sense to create more than element type in some cases.

Grid (in menulist.style) has additional attributes "horizontal" or "vertical". The list of menu items that follow (these need to be images) are laid out based on the guidance of this attribute. For example, if the attribute is "vertical", items are laid out horizontally to fit an available width and then vertically. If there isn't enough space vertically, vertical scrolling comes into effect. Similarly, if the attribute is "horizontal", items are laid out vertically to fit an available height and then horizontally. If there isn't enough space horizontally, horizontal scrolling comes into effect.

Coordinates specified as [0 ... 1] or [-1 ... 1] etc need to be specified in a fixed point range, whose minimum is -65536 and maximum is 65536. So, for example [0 ... 1] is really [0 ... 65536] and [-1 ... 1] is really [-65536 ... 65536]. This is to avoid floating point calculations and yet get enough numeric range.

The "position" element effectively specifies a coordinate of the bounding box of the element. This can be any of the combinations of {top, left, bottom, right}. Each of these attributes can have a dependency on another element's coordinates. For example something like -position="top:id.bottom+1, left:id.left+1", implies that this element's top, left corner is derived from the element "id"'s coordinates. If a dependency isn't established, then it is assumed to be derived from the screen display dimensions. "vert-limit" and "horiz-limit" are expressed as coordinates. Similar to the "position" element, an expression that is dependent on a resolved element ID is used to express the "limit" elements as coordinates in the display space. The "limit" coordinates are inclusive. "Limit" coordinates are primarily used to control a viewable area, such that elements that don't fit inside this area can be scrolled (vertically or horizontally).

If the url field expands to "$Exit", the cross-platform application shell returns control to the BREW application manager, for example. This is most useful on say a "home" page, where a "back/clear" exits the application.

The <control> tag of a <throbber> object has the following start and end loop conditions
  a. Start—time in seconds since this page was loaded.
  b. Delta—is either of:
  i. Delta time in seconds -> animation stops when start+delta is reached
  ii. Trigger event, which can be one of:
$OnKeyPress It should be noted that the above descriptions illustrate certain embodiments for illustrative purposes and one of skill in the art would recognize that specific implementations of the invention herein could be implemented in different ways. Thus, while various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method of providing for operation of cross-platform applications in a wireless phone, the method comprising:
  providing, at the wireless phone, a cross-platform application shell configured to determine properties of hardware components of the wireless phone;
  receiving, at the wireless phone, a cross-platform application comprising markup language data defining a display page of the cross-platform application, the markup language data including:
    a virtual position tag associated with a first display element on the page, the virtual position tag identifying a second display element on the page and specifying a display position of the first display element relative to the second display element on the page; and
    a virtual icon tag associated with an icon display element on the page, the virtual icon tag specifying a position of the icon display element on the page relative to another display element on the page;
  automatically determining, by executing the cross-platform application shell on the wireless phone, one or more properties of the hardware components of the wireless phone; and
  executing the cross-platform application on the wireless phone, the executing comprising:
    generating a display layout for the page of the cross-platform application for display on a display device associated with the wireless phone, wherein generating the display layout comprises using one or more of the determined properties of the hardware components of the wireless phone, in combination with the virtual position tag specifying the display position of the first display element on the page relative to the second display element on the page, to determine an actual display location on the display device of the first display element;
    identifying a state value for the virtual icon tag; and
    using the identified state value when the virtual icon tag is identified to determine a display image for the icon display element.

2. The method of claim 1, wherein the virtual position tag specifies the display position as an offset of the first display element relative to the second display element on the page.

3. The method of claim 2, wherein executing the cross-platform application includes replacing the virtual position tag with coordinates corresponding to the actual display location of the first display element on the display device.

4. The method of claim 3, further including:
using the display layout to generate a rendering of the page, the rendering including the first display element.

5. The method of claim 1, wherein the automatically determining one or more properties includes determining a screen size for the display device.

6. The method of claim 1, wherein automatically determining one or more properties includes identifying at least one property selected from the following group of properties: a screen size for a display screen of the wireless phone; a processor speed for the wireless phone; a memory size for the wireless phone; and a set of supported display images for the wireless phone.

7. The method of claim 1,
wherein a processor of the wireless phone executes the cross-platform application shell and the cross-platform application.

8. The method of claim 1, wherein the cross-platform application is generic to a platform of the wireless phone.

9. A wireless phone operable to run cross-platform applications, the wireless phone including:
a storage device storing:
a cross-platform application shell configured to determine properties of hardware components of the wireless phone; and
a cross-platform application including markup language data defining a display page of the cross-platform application, the markup language data including:
a virtual position tag associated with a first display element on the page, the virtual position tag identifying a second display element on the page and specifying a display position of the first display element relative to the second display element on the page; and
a virtual icon tag associated with an icon display element on the page, the virtual icon tag specifying a position of the icon display element on the page relative to another display element on the page;
a display screen operable to display information to a user of the phone; and
a processor coupled to the display screen and operable to drive the display screen to display information wherein the processor is configured to:
execute the cross-platform application shell to automatically identify one or more properties of the hardware components of the wireless phone; and
execute the cross-platform application to:
generate a display layout of the page for display on the display screen, wherein generating the display layout includes using the virtual position tag specifying the position of the first display element on the page relative to the second display element on the page, in combination with the identified one or more properties of the hardware components of the wireless phone, to determine an actual display location of the of the first display element on the display screen;
identify a state value for the virtual icon tag; and
use the identified state value when the virtual icon tag is identified to determine a display image for the icon display element.

10. The wireless phone of claim 9, wherein the virtual position tag specifies the display position as an offset of the first display element relative to the second display element on the page.

11. The wireless phone of claim 9, wherein the processor is further configured to replace the position tag with coordinates corresponding to the actual display location of the first display element on the display device.

12. The wireless phone of claim 9, wherein the one or more properties includes a screen size for the display screen of the wireless phone.

13. The wireless phone of claim 9, wherein the one or more properties includes at least one of: a screen size for the display screen; a processor speed for the processor; a memory size for a memory element of the wireless phone; and a set of supported display images for the phone.

14. The wireless phone of claim 9, wherein the cross-platform application shell enables cross-platform applications to be operable on each of a plurality of different wireless phone platforms.

15. The wireless phone of claim 9, wherein the execution of the cross-platform application shell is operable to use information regarding at least a screen size and screen resolution of the display screen, in combination with the relative position of the first display element, to determine the actual display location of the display element on the display screen.

16. The wireless phone of claim 9, wherein the execution of the cross-platform application shell is operable to use information regarding the wireless phone to select display sizes for displaying the display element on the display screen.

17. The wireless phone of claim 9, wherein the execution of the cross-platform application shell is operable to use information regarding the display screen to select, for the first display, a particular image to use to represent the first display element on the display screen, the particular image being one of a plurality of images that correspond to the first display element.

* * * * *